US010938635B2

(12) United States Patent
Islam et al.

(10) Patent No.: US 10,938,635 B2
(45) Date of Patent: *Mar. 2, 2021

(54) SYSTEMS AND METHODS FOR CONFIGURING SLOT FORMATS WITH MULTIPLE SWITCHING POINTS PER SLOT

(71) Applicant: Huawei Technologies Co., Ltd., Shenzhen (CN)

(72) Inventors: Toufiqul Islam, Ottawa (CA); Yu Cao, Kanata (CA); Jianglei Ma, Ottawa (CA); Hua Xu, Ottawa (CA); Amine Maaref, Ottawa (CA); Liqing Zhang, Ottawa (CA); Kelvin Kar Kin Au, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/983,890

(22) Filed: May 18, 2018

(65) Prior Publication Data

US 2019/0089583 A1    Mar. 21, 2019

Related U.S. Application Data

(60) Provisional application No. 62/559,479, filed on Sep. 15, 2017.

(51) Int. Cl.
*H04L 12/24* (2006.01)
*H04W 72/04* (2009.01)
*H04W 88/08* (2009.01)

(52) U.S. Cl.
CPC ..... *H04L 41/0803* (2013.01); *H04W 72/0446* (2013.01); *H04W 72/042* (2013.01); *H04W 88/08* (2013.01)

(58) Field of Classification Search
None
See application file for complete search history.

(56) References Cited

U.S. PATENT DOCUMENTS

| 10,404,533 | B2* | 9/2019 | Islam | H04W 72/0446 |
| 2016/0353436 | A1 | 12/2016 | Au et al. | |

(Continued)

FOREIGN PATENT DOCUMENTS

| WO | 2002082705 A1 | 10/2002 |
| WO | 2016089146 A1 | 6/2016 |
| WO | 2017014560 A1 | 1/2017 |

OTHER PUBLICATIONS

"3rd Generation Partnership Project; Technical Specification Group Radio Access Network; NR; Physical Channels and Modulation (Release 15)", 3GPP TS 38.211, V0.1.3, Aug. 2017, 30 Pages.

(Continued)

*Primary Examiner* — Ayaz R Sheikh
*Assistant Examiner* — Sori A Aga
(74) *Attorney, Agent, or Firm* — Slater Matsil, LLP

(57) ABSTRACT

Systems and methods are provided that facilitate multiple switching points within a slot. A slot format indication is conveyed to a user equipment which indicates which symbols within a slot are uplink, downlink or unknown. Some formats feature half-slot switching meaning that a switch from uplink to downlink transmission takes place twice within a slot. Switching on a more frequent basis can deliver improved latency.

40 Claims, 10 Drawing Sheets

(56) References Cited

U.S. PATENT DOCUMENTS

| | | |
|---|---|---|
| 2017/0366996 A1 | 12/2017 | Park et al. |
| 2018/0007574 A1 | 1/2018 | Park et al. |
| 2018/0034525 A1 | 2/2018 | Park et al. |
| 2018/0083758 A1 | 3/2018 | Islam et al. |
| 2018/0102817 A1 | 4/2018 | Park et al. |
| 2018/0115357 A1 | 4/2018 | Park et al. |
| 2018/0212800 A1 | 7/2018 | Park et al. |
| 2018/0249433 A1 | 8/2018 | Shin et al. |
| 2018/0278380 A1 | 9/2018 | Kim et al. |
| 2018/0279304 A1 | 9/2018 | Lee et al. |
| 2018/0376476 A1* | 12/2018 | Lee ................. H04L 5/001 |
| 2019/0312958 A1* | 10/2019 | Zhang .............. H04L 27/2666 |

OTHER PUBLICATIONS

Huawei, HiSilicon, "Support of URLLC for TDD", 3GPP TSG RAN WG1 Meeting #90, R1-1713748, Prague, Czech Republic, Aug. 21-25, 2017.

Huawei, HiSilicon, "Remaining details on group-common PDCCH", 3GPP TSG RAN WG1 Meeting AH_NR#3, R1-1715396, Nagoya, Japan, Sep. 18-21, 2017.

MCC Support, "Final Report of 3GPP TSG RAN WG1 #89 v1.0.0 (Hangzhou, China, May 15-19, 2017)", 3GPP TSG RAN WG1 Meeting #90, R1-1712031, Prague, Czech Rep, Aug. 21-25, 2017.

Huawei, et al., "Dynamic and semi-static DL/UL resource partition", 3GPP TSG RAN WG1 Meeting AH_NR#3, R1-1715398, Sep. 18-21, 2017, 6 Pages, Nagoya, Japan.

* cited by examiner

| Format i |
|---|

FIG. 2

| Format i | Format j | Format k | ....... | Format m |
|---|---|---|---|---|

Slot x (+ offset)                                             Slot x + N-1 (+ offset)

FIG. 3

| Format A : 7 symbols | Format A: 7 symbols |
|---|---|

14-symbol slot: One time unit

FIG. 4

| Format A : 7 symbols | Format B: 7 symbols |
|---|---|

14-symbol slot: One time unit

FIG. 5

| Format A: e.g., DL 5 OFDM Symbol, G 1 OFDM Symbol, UL 1 OFDM Symbol | Format B: e.g., DL 2 OFDM Symbol, G 1 OFDM Symbol, UL 3 OFDM Symbol |
|---|---|
| 7-symbol-half slot | 7-symbol-half slot |

FIG. 6

| Format A: e.g., DL 5 OFDM Symbol, G 1 OFDM Symbol, UL 1 OFDM Symbol |
|---|

FIG. 7

| Format A: e.g., DL 5 OFDM Symbol, G 1 OFDM Symbol, UL 1 OFDM Symbol | Mirrored Format A: e.g., DL 1 OFDM Symbol, G 1 OFDM Symbol, UL 5 OFDM Symbol |
|---|---|

FIG. 8

| 00: DL | 01: UL |
|---|---|
| 10: GP | 11: UKWN |

| 00 | 00 | 00 | 11 | 10 | 01 |
|---|---|---|---|---|---|

7-symbol half slot: 2 bits indicate type of symbol

FIG. 9

| Format index | Configuration details |
|---|---|
| 1 | DL: 10 OFDM Symbol, Guard: 2 OFDM Symbol, UL: 2 OFDM Symbol |
| 2 | DL: 8 OFDM Symbol, Guard: 2 OFDM Symbol, UL: 4 OFDM Symbol |
| 3 | DL: 4 OFDM Symbol, UKWN: 2 OFDM Symbol, Guard: 2 OFDM Symbol, UL: 4 OFDM Symbol |
| ...... | ...... |
| i | DL: 2 OFDM Symbol, Guard: 2 OFDM Symbol, UL: 10 OFDM Symbol |
| i+1 | DL: 5 OFDM Symbol, Guard: 1 OFDM Symbol, UL: 1 OFDM Symbol, DL: 5 OFDM Symbol, Guard: 1 OFDM SymbolS, UL: 1 OFDM Symbol |
| i+2 | DL: 1 OFDM Symbol, Guard: 1 OFDM Symbol, UL: 5 OFDM Symbol, DL: 5 OFDM Symbol, Guard: 1 OFDM Symbol, UL: 1 OFDM Symbol |
| ...... | ...... |
| j | DL: 4 OFDM Symbol, Guard: 1 OFDM Symbol, UL: 2 OFDM Symbol, DL: 4 OFDM Symbol, Guard: 1 OFDM Symbol, UL: 2 OFDM Symbol |

Rows 1–i: 14-symbol based switching

Rows i+1–j: 7-symbol based switching — Can be any configurations for half-slots (includes both repetition and different configurations for half-slots)

FIG. 10

SYSTEMS AND METHODS FOR CONFIGURING SLOT FORMATS WITH MULTIPLE SWITCHING POINTS PER SLOT

CROSS-REFERENCE

This application claims the benefit of U.S. Provisional Patent Application No. 62/559,479 filed Sep. 15, 2017 entitled "Systems and Methods for Configuring Slot Formats with Multiple Switching Points per Slot", which is hereby incorporated by reference in its entirety.

FIELD

The present application relates to wireless communications, and specifically, methods and systems of adaptive frame structure for time division duplex.

BACKGROUND

In a wireless communications system, transmissions are generally communicated in accordance with pre-defined fixed frame structures. Fixed frame structures are used so that communicating devices have knowledge of resources, such as time, frequency, or time and frequency resources; and interferences between different resources and between transmitting and receiving of signals may be avoided or reduced. Modern wireless networks are increasingly used to support communications of diverse traffic types. Different traffic types may have different characteristics and quality of service (QoS) requirements, such as latency, which fixed frame structures may be unable to accommodate. Accordingly, adaptive frame structures capable of efficiently supporting different traffic types are desired.

SUMMARY

Technical advantages are generally achieved, by embodiments of this disclosure which describe system and methods for configuring slot formats with multiple switching points per slot. At a switching point within a slot, communications changes from downlink to uplink, or vice versa.

Configuring multiple switching points within a slot can be beneficial, in particular for low latency communications which may require fast HARQ round trip time. For example, if a slot is defined of 14 OFDM symbols, then a slot based on 15 KHZ sub-carrier spacing (SCS) and 30 KHz would have a duration of 1 ms and 0.5 ms respectively. In this case, if only one switching point is configured per slot, a low latency communication requiring end-to-end delay of 1 ms would not have enough HARQ-based re-transmission opportunities within 1 ms due to longer DL/UL switching periodicity. It will be difficult to ensure reliability requirement of some services within 1 ms. Hence, it is beneficial in some cases to configure multiple switching points per slot. In accordance with some embodiments, the network may support a set of formats or configurations for the slot of a given numerology with multiple switching points, such as two switching points, and one format or configuration from the set of supported configurations/formats can be indicated to the mobile devices by dynamic signaling.

According to one aspect of the present invention, there is provided a method of wireless communication, the method comprising: receiving, by a user equipment, a slot format information (SFI) from a base station (BS); wherein the SFI indicates at least one slot formation configuration, each of the at least slot formation configuration comprises a first configuration associated with symbols within a first duration of one slot and a second configuration associated with symbols within a second duration of the slot, the first configuration indicates location of at least one uplink symbol and location of at least one downlink symbol, and the second configuration indicates location of at least one uplink symbol and location of at least one downlink symbol; and communicating, by the user equipment, a downlink data transmission or an uplink data transmission based on the slot formation configuration; wherein the first configuration comprises at least one first switching point in a first half slot and the second configuration comprises at least a second switching point in a second half slot.

Optionally, in any of the preceding embodiments each of the first switching point and the second switching point indicates switching from downlink transmission direction to uplink transmission direction; or each of the first switching point and the second switching point indicates switching from uplink transmission direction to downlink transmission direction.

Optionally, in any of the preceding embodiments the first switching point and the second switching point indicates location of at least one guard symbol or location of one or more unknown symbols.

Optionally, in any of the preceding embodiments the method further comprises: obtaining, by the user equipment, the first configuration and the second configuration from the SFI based on a predefined relationship.

Optionally, in any of the preceding embodiments the SFI indicates at least one slot formation configuration for a slot or a group of slots.

Optionally, in any of the preceding embodiments each slot has 14 symbols, and each of the first and second durations is 7 symbols.

Optionally, in any of the preceding embodiments the first configuration and the second configuration have the same configuration in the first duration and the second duration.

Optionally, in any of the preceding embodiments receiving a slot format information comprises monitoring any one of the following: a group common physical downlink control channel (GC-PDCCH); a group common control signal; a semi-static signal.

Optionally, in any of the preceding embodiments the at least one slot format configuration has a predefined relationship as the following:

| format | symbol 0 | symbol 1 | symbol 2 | symbol 3 | symbol 4 | symbol 5 | symbol 6 | symbol 7 | symbol 8 | symbol 9 | symbol 10 | symbol 11 | symbol 12 | symbol 13 |
|---|---|---|---|---|---|---|---|---|---|---|---|---|---|---|
| 1 | DL | DL | DL | DL | DL | UKWN | UL | DL | DL | DL | DL | DL | UKWN | UL |
| 2 | DL | DL | DL | DL | UKWN | UL | UL | DL | DL | DL | DL | UKWN | UL | UL |
| 3 | DL | DL | UKWN | UL | UL | UL | UL | DL | DL | UKWN | UL | UL | UL | UL |
| 4 | DL | UKWN | UL | UL | UL | UL | UL | DL | UKWN | UL | UL | UL | UL | UL |
| 5 | DL | DL | DL | DL | UKWN | UKWN | UL | DL | DL | DL | DL | UKWN | UKWN | UL |
| 6 | DL | DL | UKWN | UKWN | UL | UL | UL | DL | DL | UKWN | UKWN | UL | UL | UL |
| 7 | DL | UKWN | UKWN | UL | UL | UL | UL | DL | UKWN | UKWN | UL | UL | UL | UL | wherein a symbol identified as "UKWN" overridden by a DL symbol or an UL symbol by a dynamic signaling.

According to another aspect of the present invention, there is provided a user equipment (UE) comprising: at least one processor configured to: receive a slot format information (SFI) from a base station (BS); communicate a downlink data transmission or an uplink data transmission based on at least one slot formation configuration; a memory coupled to the at least one processor; wherein the SFI indicates the at least one slot formation configuration, each of the at least slot formation configuration comprises a first configuration associated with symbols within a first duration of one slot and a second configuration associated with symbols within a second duration of the slot, the first configuration indicates location of at least one uplink symbol and location of at least one downlink symbol, and the second configuration indicates location of at least one uplink symbol and location of at least one downlink symbol; wherein the first configuration comprises at least one first switching point in a first half slot and the second configuration comprises at least a second switching point in a second half slot.

Optionally, in any of the preceding embodiments each of the first switching point and the second switching point indicates switching from downlink transmission direction to uplink transmission direction; or each of the first switching point and the second switching point indicates switching from uplink transmission direction to downlink transmission direction.

Optionally, in any of the preceding embodiments the at least one processor configured to receive a slot format information comprises monitoring any one of the following: a group common physical downlink control channel (GC-PDCCH); a group common control signal; a semi-static signal.

Optionally, in any of the preceding embodiments the at least one configuration has a predefined relationship as the following:

SFI indicates at least one slot formation configuration, each of the at least slot formation configuration comprises a first configuration associated with symbols within a first duration of one slot and a second configuration associated with symbols within a second duration of the slot, the first configuration indicates location of at least one uplink symbol and location of at least one downlink symbol, and the second configuration indicates location of at least one uplink symbol and location of at least one downlink symbol; and communicating, by the base station, a downlink data transmission or an uplink data transmission based on the slot formation configuration; wherein the first configuration comprises at least one first switching point in a first half slot and the second configuration comprises at least a second switching point in a second half slot.

Optionally, in any of the preceding embodiments each of the first switching point and the second switching point indicates switching from downlink transmission direction to uplink transmission direction; or each of the first switching point and the second switching point indicates switching from uplink transmission direction to downlink transmission direction.

Optionally, in any of the preceding embodiments each of the first switching point and the second switching point indicates location of at least one guard symbol or location of one or more unknown symbols.

Optionally, in any of the preceding embodiments the SFI indicates at least one slot formation configuration for a slot or a group of slots.

Optionally, in any of the preceding embodiments the first configuration and the second configuration have the same configuration in the first duration and the second duration.

Optionally, in any of the preceding embodiments transmitting a slot format information comprises transmitting any

| format | symbol 0 | symbol 1 | symbol 2 | symbol 3 | symbol 4 | symbol 5 | symbol 6 | symbol 7 | symbol 8 | symbol 9 | symbol 10 | symbol 11 | symbol 12 | symbol 13 |
|---|---|---|---|---|---|---|---|---|---|---|---|---|---|---|
| 1 | DL | DL | DL | DL | DL | UKWN | UL | DL | DL | DL | DL | DL | UKWN | UL |
| 2 | DL | DL | DL | DL | UKWN | UL | UL | DL | DL | DL | DL | UKWN | UL | UL |
| 3 | DL | DL | UKWN | UL | UL | UL | UL | DL | DL | UKWN | UL | UL | UL | UL |
| 4 | DL | UKWN | UL | UL | UL | UL | UL | DL | UKWN | UL | UL | UL | UL | UL |
| 5 | DL | DL | DL | DL | UKWN | UKWN | UL | DL | DL | DL | DL | UKWN | UKWN | UL |
| 6 | DL | DL | UKWN | UKWN | UL | UL | UL | DL | DL | UKWN | UKWN | UL | UL | UL |
| 7 | DL | UKWN | UKWN | UL | UL | UL | UL | DL | UKWN | UKWN | UL | UL | UL | UL | wherein a symbol identified as "UKWN" overridden by a DL symbol or an UL symbol by a dynamic signaling.

According to one aspect of the present invention, there is provided a method of wireless communication, the method comprising: transmitting, by a base station (BS), a slot format information (SFI) to a user equipment; wherein the one of the following: a group common physical downlink control channel (GC-PDCCH); a group common control signal; a semi-static signal; and RRC signaling.

Optionally, in any of the preceding embodiments the plurality of configurations have a predefined relationship as the following:

| format | symbol 0 | symbol 1 | symbol 2 | symbol 3 | symbol 4 | symbol 5 | symbol 6 | symbol 7 | symbol 8 | symbol 9 | symbol 10 | symbol 11 | symbol 12 | symbol 13 |
|---|---|---|---|---|---|---|---|---|---|---|---|---|---|---|
| 1 | DL | DL | DL | DL | DL | UKWN | UL | DL | DL | DL | DL | DL | UKWN | UL |
| 2 | DL | DL | DL | DL | UKWN | UL | UL | DL | DL | DL | DL | UKWN | UL | UL |
| 3 | DL | DL | UKWN | UL | UL | UL | UL | DL | DL | UKWN | UL | UL | UL | UL |
| 4 | DL | UKWN | UL | UL | UL | UL | UL | DL | UKWN | UL | UL | UL | UL | UL |
| 5 | DL | DL | DL | DL | UKWN | UKWN | UL | DL | DL | DL | DL | UKWN | UKWN | UL |

| format | symbol 0 | symbol 1 | symbol 2 | symbol 3 | symbol 4 | symbol 5 | symbol 6 | symbol 7 | symbol 8 | symbol 9 | symbol 10 | symbol 11 | symbol 12 | symbol 13 |
|---|---|---|---|---|---|---|---|---|---|---|---|---|---|---|
| 6 | DL | DL | UKWN | UKWN | UL | UL | UL | DL | DL | UKWN | UKWN | UL | UL | UL |
| 7 | DL | UKWN | UKWN | UL | UL | UL | UL | DL | UKWN | UKWN | UL | UL | UL | UL | wherein a symbol identified as "UKWN" overridden by a DL symbol or an UL symbol by dynamic signaling.

According to another aspect of the present invention, there is provided a base station comprising a processor and memory configured to implement a method comprising: transmitting, by a base station (BS), a slot format information (SFI) to a user equipment; wherein the SFI indicates at least one slot formation configuration, each of the at least slot formation configuration comprises a first configuration associated with symbols within a first duration of one slot and a second configuration associated with symbols within a second duration of the slot, the first configuration indicates location of at least one uplink symbol and location of at least one downlink symbol, and the second configuration indicates location of at least one uplink symbol and location of at least one downlink symbol; communicating, by the base station, a downlink data transmission or an uplink data transmission based on the slot formation configuration; wherein the first configuration comprises at least one first switching point in a first half slot and the second configuration comprises at least a second switching point in a second half slot.

The making and using of embodiments are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of the appended claims.

BRIEF DESCRIPTION OF THE DRAWINGS

Examples of embodiments of the invention will now be described in greater detail with reference to the accompanying drawings, in which:

FIG. 2 is an example of a slot format indication that indicates a single slot format that is the same for all slots within a duration;

FIG. 3 is an example of a slot format indication that indicates a respective slot format for each slot within a duration;

FIG. 4 is an example of a slot format indication based on half-slot configurations in which the format for the two half-slots is the same;

FIG. 5 is an example of a slot format indication based on half-slot configurations in which the format for the two half-slots is different;

FIG. 6 is a more detailed example of a slot format indication based on half-slot configurations in which the format for the two half-slots is different;

FIG. 7 is a more detailed example of a slot format indication based on half-slot configurations in which the format for the two half-slots is the same FIG. 8 is an example of a slot format indication based on half-slot configurations in which the format for the second half-slot is a mirror of the format for the first half-slot;

FIG. 9 is a specific example of a format indication for a half-slot, where 2 bits indicate the type of each symbol in the half-slot;

FIG. 10 is an example of a set of formats defined within a single table that includes some formats based on half-slot switching and some formats based on full slot switching;

DETAILED DESCRIPTION

Figure 1A:
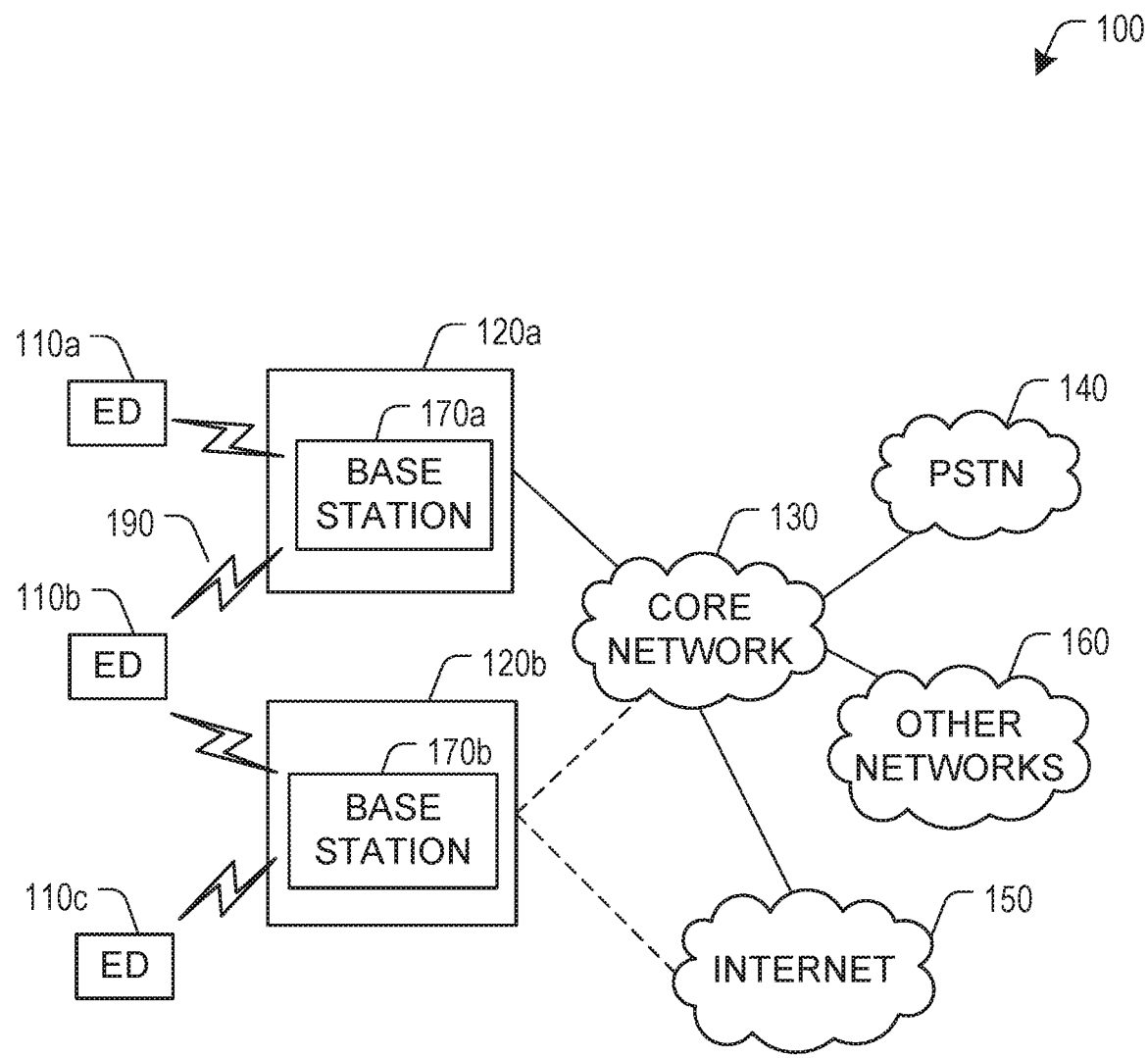
FIG. 1A is a block diagram of an example communications system within which embodiments of the present disclosure could be implemented.

FIG. 1A illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, narrowcast, user equipment to user equipment, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100. The EDs 110a-110c are configured to operate, communicate, or both, in the communication system 100. For example, the EDs 110a-110c are configured to transmit, receive, or both via wireless or wired communication channels. Each ED 110a-110c represents any suitable end user equipment for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1A, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown. The EDs 110a-110c and base stations 170a-170b are examples of communication equipment that can be configured to implement some or all of the functionality and/or embodiments described herein. In the embodiment shown in FIG. 1A the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Figure 1B:
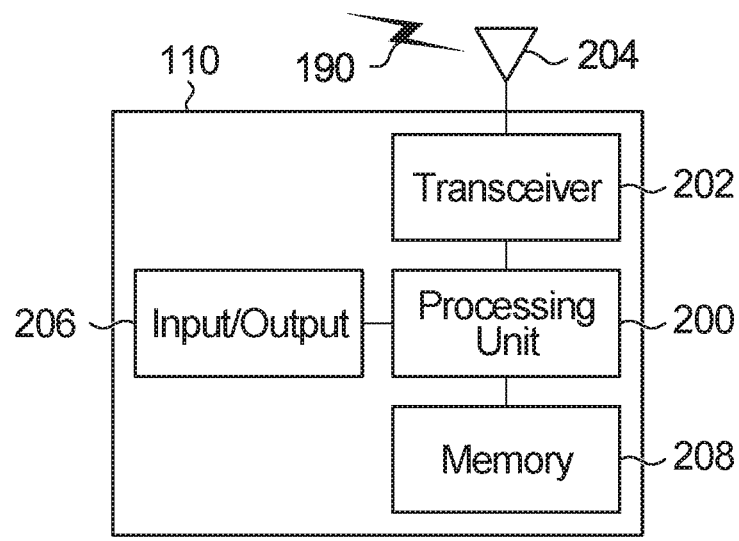
FIG. 1B is a block diagram of an example electronic that may implement the methods and teachings according to this disclosure.
Figure 1C:
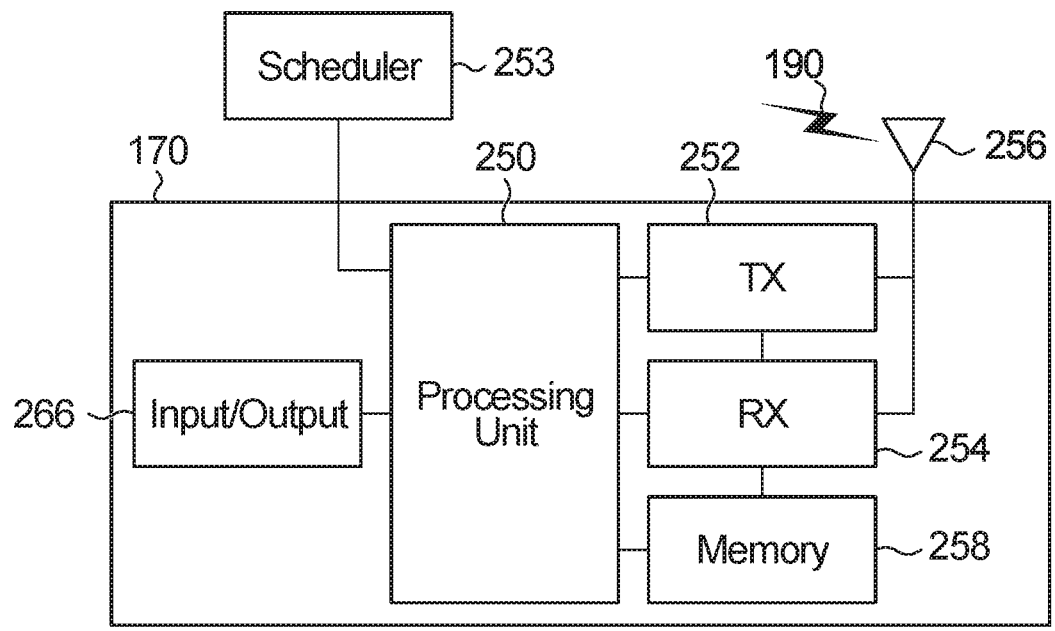
FIG. 1C is a block diagram of an example base station that may implement the methods and teachings according to this disclosure.

FIGS. 1B and 1C illustrate example devices that may implement the methods and teachings according to this disclosure. In particular, FIG. 1B illustrates an example ED 110, and FIG. 1C illustrates an example base station 170. These components could be used in the communication system 100 or in any other suitable system.

As shown in FIG. 1B, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 1C, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Communications between the network and mobile devices may be based on slots. Such slots are based on time division duplexing (TDD), with uplink transmissions occurring at times that are distinct from downlink transmission. In a specific example, each slot has 14 OFDM symbols. A slot may include one or a combination of:

a. downlink (DL) symbols;
b. uplink (UL) symbols;
c. guard symbols;
d. unknown or reserved symbols.

Figure 1D:
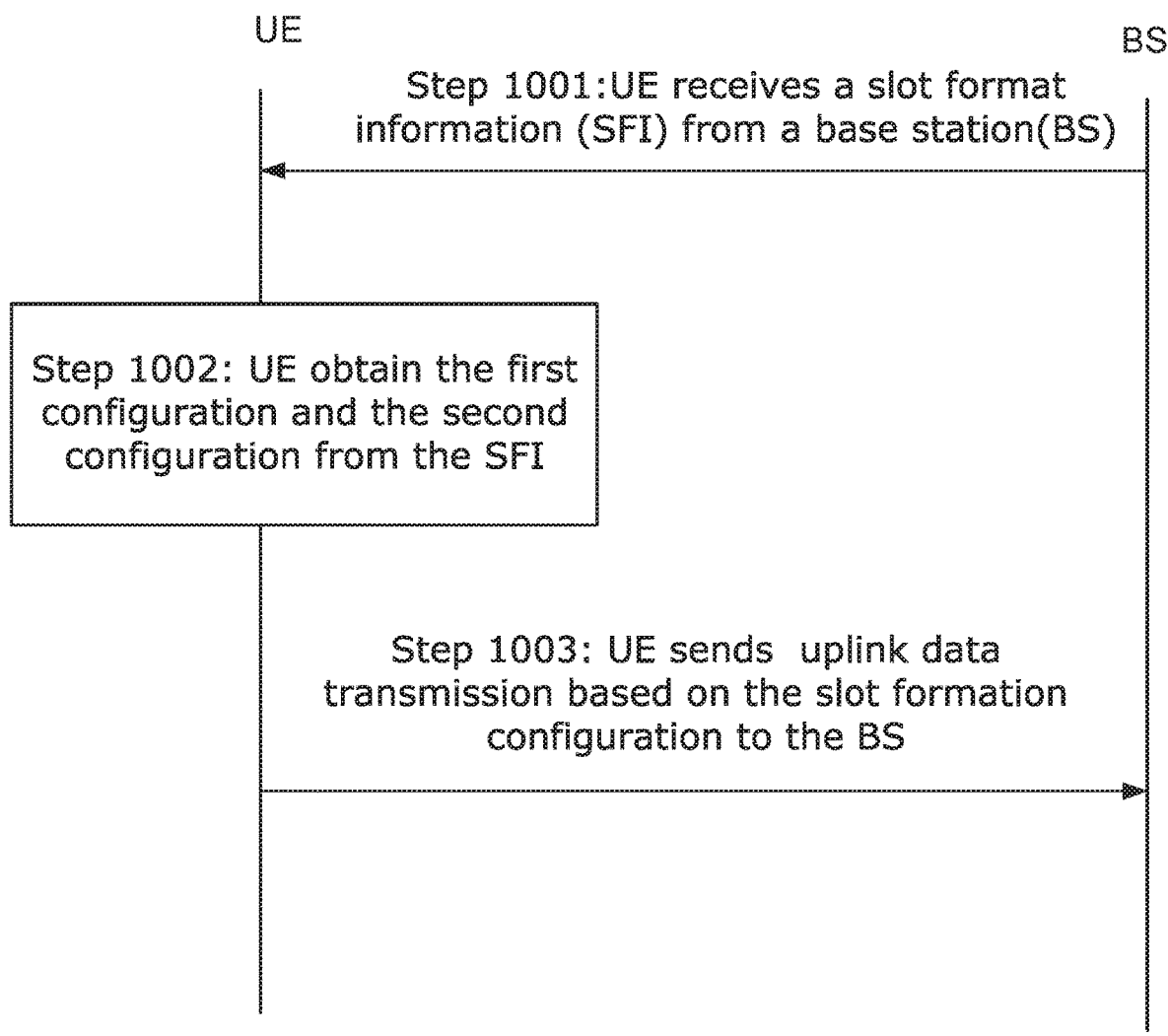
FIG. 1D is a flowchart of a method for a UE to be configured with a slot format indication.

FIG. 1D illustrates an example of a method provided by an embodiment of the disclosure that device such as those depicted in FIGS. 1A to 1C may implement. The method begins with step 1001, in which a UE receives a slot format information (SFI) from a base station (BS).

In one embodiment, the SFI indicates at least one slot formation configuration. Each slot formation configuration has a first configuration associated with symbols within a first duration of one slot and a second configuration associated with symbols within a second duration of the slot. The first configuration indicates the location of at least one uplink symbol and location of at least one downlink symbol. Similarly, the second configuration indicates the location of at least one uplink symbol and location of at least one downlink symbol. It is the combination of the first and second configurations that defines the slot format configuration.

In one embodiment, the first configuration has at least one first switching point in a first half slot and the second configuration has at least a second switching point in a second half slot.

In one embodiment, each of the first switching point and the second switching point indicates switching from downlink transmission direction to uplink transmission direction. Alternatively, each of the first switching point and the second switching point indicates switching from uplink transmission direction to downlink transmission direction.

In one embodiment, each of the first switching point and the second switching point indicates location of at least one guard symbol or location of one or more unknown symbols.

In one embodiment, the SFI indicates at least one slot formation configuration for a slot or a group of slots.

In one embodiment, the first configuration and the second configuration have the same configuration in the first duration and the second duration.

In one embodiment, UE receives a slot format information by monitoring a group common physical downlink control channel (GC-PDCCH).

In one embodiment, UE receives a slot format information by monitoring a group common control signal.

In one embodiment, UE receives a slot format information by monitoring a semi-static signal, such as RRC signaling.

In step 1002, the UE obtains the first configuration and the second configuration from the SFI. For example, in some embodiments, the UE obtains the first configuration and the second configuration from the SFI based on a predefined relationship. Alternatively, in some embodiments, the UE directly obtains at least one slot formation configuration from the SFI.

In one embodiment, the slot format information indicates one of a plurality of configurations stored by the UE.

In one embodiment, the received slot format information refers to a format or formats in one or both of a first and a second table, the first table containing slot formats with 7-symbol duration for use in configuring the first and second duration of a slot and the second table containing slot formats with 14-symbol for use in configuring an entire slot.

In one embodiment, the received slot format information indicates that the format is from the first table, or indicates that the format is from the second table.

In one embodiment, the received slot format information refers to a format in a table containing slot formats with 7-symbol based switching and also containing slot formats with 14-symbol based switching.

In step 1003, the UE communicates a downlink data transmission or an uplink data transmission based on the slot formation configuration Further embodiments that concern communicating between UE and BS are described below.

In some embodiments, a slot format indication may indicate a format for a slot that includes one or a combination of DL symbols, UL symbols, and other symbols that are neither DL nor UL symbols for a particular UE, i.e., no transmission to and from the mobile device takes place on those symbols. The other symbols may be called 'unknown' in general from the perspective of the mobile device. One or more of the indicated 'Unknown' symbols may serve the purpose of guard period or gap between DL and UL symbol(s), i.e., there may not be any 'guard' symbol(s) identified in a slot, instead some symbols can be called 'unknown' generally, one or more of which can be used as gap or can be overridden as DL or UL symbols by other dynamic signaling. To this end, a slot may include one or a combination of:

a. downlink (DL) symbols;
b. uplink (UL) symbols;
c. unknown symbols.

A fixed or semi-static resource allocation as between DL, UL, guard, unknown or reserved/other with all slots may not be efficient. DL/UL resource sharing may need to change dynamically based on load and traffic types supported.

In accordance with an embodiment of the invention, in order to facilitate dynamically changing the slot format, i.e. dynamically adjusting how the slot is subdivided as between uplink and downlink transmissions, a slot format indication (SFI) is transmitted from the network to a group of UEs. The SFI is received and processed by the UEs, and transmissions/receptions are performed by both the network in accordance with the conveyed SFI. There are a plurality of possible slot formats, and each value of the slot format indication is associated with a particular slot format.

A slot format indicates a combination of one or more of:
e. which symbols (i.e. location within the slot) are downlink symbols;
f. which symbols are uplink symbols;
g. which symbols are guard symbols;
h. which symbols are unknown or reserved symbols.

Alternatively, unknown symbols can encompass any symbols that the mobile device does not need to transmit/receive, such as guard symbols or reserved or blank symbols, and a slot format indicates a combination of one or more of:

a. which symbols are downlink symbols;
b. which symbols are uplink symbols;
c. which symbols are unknown symbols.

A switching point within a slot is associated with a time when the symbols within a slot switch from downlink to uplink. At a switching point, the base station switches from transmitting to receiving, and the mobile device switches from receiving to transmitting. In accordance with an embodiment of the invention, at least one of the available slot formats has more than one switching point, and as such, the associated SFI for each such slot format indicates more than one switching point.

In another embodiment, a switching point within a slot is associated with a time when the symbols within a slot switch from uplink to downlink. At a switching point, the base station switches from receiving to transmitting, and the mobile device switches from transmitting to receiving. In accordance with an embodiment of the invention, at least one of the available slot formats has more than one switching point, and as such, the associated SFI for each such slot format indicates more than one switching point.

In some embodiments, the SFI can be transmitted in a group common control channel such as group common downlink control channel. A specific example involves using a group-common-physical downlink control channel (GC-PDCCH). One or more GC-PDCCHs can be used to provide common information from the network to a group of UEs. The GC-PDCCH may, for example, be detected based on radio network temporary identifier (RNTI), known to the group of mobile devices monitoring the GC-PDCCH. The GC-PDCCH may also include a cyclic redundancy check (CRC).

The GC-PDCCH may have one or more fields comprising a plurality of bits, excluding any bits used for CRC/RNTI. One or more fields can be mobile device specific, i.e. for a specific mobile device of the group of mobile devices monitoring the GC-PDCCH. Radio resource control (RRC) configuration may be used to inform a mobile device which field(s) inside the GC-PDCCH belong to that UE. In addition, one or more fields can be common to the group of UEs. Each of the group of mobile devices reads all the common fields.

When the GC-PDCCH is used to transmit the SFI, the SFI can be indicated using one or more fields that are common to a group of UEs. The SFI transmission by the network may be considered as an application of group common-downlink control information (GC-DCI).

In some embodiments, each mobile device has a current active bandwidth part, which is part of a larger system bandwidth, and each mobile device monitors a GC-PDCCH or other resource for SFI in a common search space of the current active bandwidth part.

In some embodiments, the SFI indicates the slot format for a plurality of slots within a duration, for example N slots. The SFI may indicate a single slot format that is the same for all of the slots within the duration (see for example FIG. 2), or it may indicate a different format for each slot within the duration (see for example FIG. 3). In some embodiments, SFI may indicate a slot format for a single slot, and the mobile device may be able to derive the SFI of the other slots by using a pattern. The pattern can be predefined/preconfigured (e.g., RRC signaling or system information or MAC CE) or indicated in the SFI. In some embodiments, a plurality of patterns may be defined in RRC signaling and SFI may indicate a pattern among the plurality of patterns to be used. In one example, N=10, the SFI may indicate the slot format of the first slot, and the pattern is to simply repeat the same format for all slots. In another example, N=10, the SFI may indicate the slot format for the first slot (slot index 0), and the pattern is such that all the slot with even index (slot index 0, 2, 4, 6, 8) use the same format as the first slot and all the slot with odd index (slot index 1, 3, 5, 7, 9) use a correlated format (e.g. mirror pattern) with respect to the format of the first slot or a different independent format compared to the format used in first slot. More generally, SFI may indicate formats for M slots out of N slots, where 1<=M<N and N is the total number of slots within the scope of the SFI indication, and a pattern can be identified/pre-configured to obtain slot formats for all the slots. As mentioned above, the pattern can be indicated dynamically in the GC-PDCCH carrying SFI.

In accordance with an embodiment of the invention, a structure of GC-PDCCH is provided which includes fields for both pattern (1<=K, K is a integer, fields for pattern indication) and slot format indication (1<=M, M is an integer, fields for SFI). Note that the set of locations of the fields shown below is only an example, and generally the K and M fields can be located in a different manner as well. In some embodiments, SFI may indicate slot format for each individual slot among the group of slots independently.

| Pattern Indication field 1 | ... | Pattern Indication field K | SFI field 1 | ... | SFI field M |
| --- | --- | --- | --- | --- | --- |

Optionally, the SFI may include an offset, which if present, indicates slot position relative to a reference sub-frame/slot. Offset can be pre-configured by higher layer signaling or dynamically indicated in SFI in a field. In one embodiment, the reference slot/sub-frame can be when mobile device receives SFI in a GC-PDCCH. In one example, reference location is in slot x (can be the slot where SFI is received), SFI is indicated for N slots, where first slot of the N slots starts after k slots of the reference location in slot x. The value of k can be default or semi-statically configured or dynamically indicated.

In some embodiments, a set or sets of possible formats is configured using higher layer signaling, and the SFI indicates a format from one of the sets of higher layer configured formats.

In some embodiments, a format is defined for a given duration T comprising N time units (N>=1). Each time unit can be defined to include M (M>=1) slots of P symbols each. Alternatively, each time unit can be defined to include L symbols (L≥1), one slot comprising P symbols. In one example, P can be 7 or 14 symbols.

In a first option, there are K switching points within each time unit. As noted above, each unit may be L symbols, in which case, 1≤K≤L. Alternatively, each time unit may be M slots, in which case 1≤K≤MP.

In a second option, there are K switching points within the duration, where 1≤K≤N. For this option, at most one switching point per time unit can be configured/indicated. The interval between successive switching points within the duration may comprise a group of time units. In one example, the SFI is indicated for N=>1 slots. There can be a pre-configured switching pattern or format within a slot, e.g., x DL symbols, followed by y unknown, followed by z UL symbols, where x=>1, y=>0, z=>0, and x+y+z=P applies (definition of P provided above). GC-PDCCH carrying SFI can include a field to indicate the slot where switching takes place. The slots before and after the indicated slot can be DL and UL/Unknown respectively.

SFI Indication Based on Half-Slot Switching Granularity

In a specific embodiment, the approach described is used to provide an SFI indication based on half-slot switching granularity, meaning there can be a respective switch in each half-slot.

Applying the first option introduced above to achieve half-slot switching, each time unit is one slot, and K=2. In a specific example, the slot is 14 symbols, and different formats are defined in which there can be a switching point in the first half-slot and switching point in the second half-slot. In a specific example, within a set of formats, at least one slot format indication is associated with a format/configuration for the first 7 symbols within a 14-symbol slot which is repeated for the second 7 symbols within the 14-symbol slot. An example is depicted in FIG. 4 which shows Format or configuration A for the first 7 symbols and the second 7 symbols. In this example, SFI indication for the full slot would be a format where a configuration/format is repeated for each half-slot.

In another specific example, within a set of formats, at least one slot format indication is associated with a format/configuration for the first 7 symbols within a 14-symbol slot and a different format/configuration for the second 7 symbols within the 14-symbol slot. An example is depicted in FIG. 5 which shows Format A for the first 7 symbols and format B for the second 7 symbols. In this example, SFI indication for the full slot would be a format where two configuration/formats are indicated for the half-slots.

The formats/configurations indicated for each half-slot may be indicated from a set of formats/configurations configured by higher layer signaling. For each half-slot, each format/configuration has $N_{DL}$ symbols, $N_{UL}$ symbols, $N_{guard}$ guard symbols, $N_{unknown}$ unknown or reserved symbols configured, where $N_{DL}+N_{UL}+N_{guard}+N_{unknown}=7$ symbols, $0<=\{N_{DL}, N_{UL}, N_{guard}, N_{unknown}\}<=7$ applies. As mentioned before, guard or gap symbols may not be explicitly indicated in a format, instead only unknown symbols are indicated.

In one embodiment, combination/pair of configurations for half-slots can be classified into different types. In one embodiment, one or more fields in the GC-PDCCH carrying SFI can be used to indicate slot format based on any of the following types. Those field(s) can additionally indicate slot format based one switching point as well.

Type 1: independent configurations in half-slots, where each configuration is selected from a set of supported higher layer configured configurations;

Type 2: repeated configurations in half-slots, where each configuration is selected from a set of supported higher layer configured configurations;

Type 3: correlated configurations in half-slots (e.g., mirrored configurations), where each configuration is selected from a set of supported higher layer configured configurations Type 4: Configuration of a half-slot comprises a bitmap, and there may not be any set of pre-defined higher layer configurations for a half-slot.

In some embodiments, for at least one slot format, each half-slot has an independent configuration, i.e., Type 1 mentioned above. The configurations for the two half-slots may be separately indicated in the SFI within the GC-PDCCH. For example, there can be two fields, one field indicating the format/configuration for the first half-slot, and the other field indicating the format for the second half-slot. An example is shown in FIG. 6. Alternatively, only one field is used in the GC-PDCCH carrying SFI to indicate slot format based on both one and two switching points (where each half-slot has a switching point). In this case, the slot format indicated based on switching per half-slot comprises different configurations/formats for the half-slot, i.e., for the first and second half-slots, configurations A and B are indicated, respectively.

invention. One configuration of each half-slot can be obtained as a unique combination of the identified options for each symbol and a slot format comprises configurations of both half-slots.

| Symbol 0 | Symbol 1 | Symbol 2 | Symbol 3 | Symbol 4 | Symbol 5 | Symbol 6 |
|---|---|---|---|---|---|---|
| DL | Unknown/ DL/UL/ Gap/ Reserved/ Empty | Unknown/ DL/UL/ Gap/ Reserved/ Empty | Unknown/ DL/UL/ Gap/ Reserved/ Empty | Unknown/ DL/UL/ Gap/ Reserved/ Empty | Unknown/ DL/UL/ Gap/ Reserved/ Empty | Unknown/ DL/UL/ Gap/ Reserved/ Empty |

←--------------------------------1st half-slot--------------------------------→

| Symbol 7 | Symbol 8 | Symbol 9 | Symbol 10 | Symbol 11 | Symbol 12 | Symbol 13 |
|---|---|---|---|---|---|---|
| DL | Unknown/ DL/UL/ Gap/ Reserved/ Empty | Unknown/ DL/UL/ Gap/ Reserved/ Empty | Unknown/ DL/UL/ Gap/ Reserved/ Empty | Unknown/ DL/UL/ Gap/ Reserved/ Empty | Unknown/ DL/UL/ Gap/ Reserved/ Empty | Unknown/ DL/UL/ Gap/ Reserved/ Empty |

←--------------------------------2nd half-slot--------------------------------→

In some embodiments, for at least one format, both half-slots have same configuration, i.e., Type 2 mentioned above. In this case, the SFI indicates one format only based on half-slot switching, which is duplicated in each half-slot. An example is shown in FIG. 7. In one example, one field is used in the GC-PDCCH carrying SFI to indicate slot format based on both one and two switching points (where each half-slot has a switching point). In this case, the slot format indicated based on switching per half-slot comprises same configuration/format for both slots.

In some embodiments, for at least one format, the formats in the two half-slots are correlated but not the same, e.g., mirror of each other, i.e., Type 3 mentioned above. From the format of one half-slot, the format of the second half-slot can be derived. In this case, again only one format needs to be indicated in the SFI. In some embodiments, a flag or other indication can be used to switch between a format/configuration in which both half-slots have the same configuration, and a format/configuration in which the formats in the two half-slots are correlated. An example is shown in FIG. 8. Alternatively, no flag may be needed. Some slot formats can be configured where half-slots have a mirrored configuration. The field in the GC-PDCCH to indicate SFI can be used to indicate such slot format.

In some embodiments, for at least one slot format, the SFI is a bitmap-based format indicator that indicates for each symbol in the half-slot whether the symbol is a DL, UL, guard or unknown (or DL, UL, unknown). Configuration of the half-slots can be same or different. If they are the same, then the bitmap may need to be indicated for one half-slot only. If they are different, then bitmaps for both half-slots need to be indicated. This can be achieved, for example, with 2 bits per symbol. The bitmap can apply to both half-slots, or a respective bitmap for each half-slot can be provided. More generally, each symbol can be represented by $\log_2 J$ bits, if there are J possible statuses/options for each symbol. For example K=4 when each symbol can be DL or UL or guard or unknown. An example is shown in FIG. 9 which employs a 14 bit bitmap needed for each half-slot. In some embodiment, each symbol has only 3 states, i.e., it can be DL or UL or unknown. In this case, the total number of states for the 14 symbols in a slot is at most $3^{14}$, and it may require at most $\mathrm{ceil}(\log 2(3^{14}))$ bits to indicate all the possible statues of 14 symbols, where ceil(.) implies rounding to the next integer value.

An example of options for each symbol within each half slot is shown below, as provided by an embodiment of the In some embodiments, a format can be indicated for a 14-symbol slot that includes a pair of any combination of configurations listed below, i.e., the pair may indicate same configuration for both half-slots or different configurations:

a) All DL (7 symbols)
b) All UL (7 symbols)
c) DL ($N_{DL}$ symbols), followed by Guard period ($N_{guard}$ symbols), followed by UL ($N_{UL}$ symbols)
  $1<=N_{DL}<=5$, $1<=N_{guard}<=5$, $1<=N_{UL}<=5$, $N_{DL}+N_{guard}+N_{UL}=7$ applies
d) UL ($N_{UL}$ symbols), followed by Guard period ($N_{guard}$ symbols), followed by DL ($N_{DL}$ symbols)
  $1<=N_{UL}<=5$, $1<=N_{guard}<=5$, $1<=N_{DL}<=5$, $N_{UL}+N_{guard}+N_{DL}=7$ applies
e) UL ($N_{UL}$ symbols), followed by DL ($N_{DL}$ symbols), followed by Guard period ($N_{guard}$ symbols),
  $1<=N_{UL}<=5$, $1<=N_{DL}<=5$, $1<=N_{guard}<=5$, $N_{UL}+N_{DL}+N_{guard}=7$ applies
f) DL ($N_{DL}$ symbols), followed by Unknown/reserved symbols ($N_{unknown}$ symbols), Guard period ($N_{guard}$ symbols), followed by UL ($N_{UL}$ symbols)
  $1<=N_{DL}<=4$, $1<=N_{unknown}<=4$, $1<=N_{guard}<=4$, $1<=N_{UL}<=4$, $N_{DL}+N_{unknown}+N_{guard}+N_{UL}=7$ applies
g) Unknown/reserved symbols ($N_{unknown}$ symbols), followed by DL ($N_{DL}$ symbols), followed by Guard period ($N_{guard}$ symbols), followed by UL ($N_{UL}$ symbols)
  $1<=N_{unknown}<=4$, $1<=N_{DL}<=4$, $1<=N_{guard}<=4$, $1<=N_{UL}<=4$, $N_{unknown}+N_{DL}+N_{guard}+N_{UL}=7$ applies
h) DL ($N_{DL}$ symbols), Guard period ($N_{guard}$ symbols), followed by Unknown/reserved symbols ($N_{unknown}$ symbols), followed by UL ($N_{UL}$ symbols)
  $1<=N_{DL}<=4$, $1<=N_{guard}<=4$, $1<=N_{unknown}<=4$, $1<=N_{UL}<=4$, $N_{DL}+N_{guard}+N_{unknown}+N_{UL}=7$ applies
i) DL ($N_{DL}$ symbols), followed by Guard period ($N_{guard}$ symbols), followed by UL ($N_{UL}$ symbols), followed by Unknown/reserved symbols ($N_{unknown}$ symbols)
  $1<=N_{DL}<=4$, $1<=N_{guard}<=4$, $1<=N_{UL}<=4$, $1<=N_{unknown}<=4$, $N_{DL} N_{guard} N_{UL}+N_{unknown}=7$ applies
j) UL ($N_{UL}$ symbols), followed by Guard period ($N_{guard}$ symbols), followed by Unknown/reserved symbols ($N_{unknown}$ symbols), followed by DL ($N_{DL}$ symbols)
  $1<=N_{UL}<=4$, $1<=N_{guard}<=4$, $1<=N_{unknown}<=4$, $1<=N_{DL}<=4$, $N_{UL}+N_{guard}+N_{unknown}+N_{DL}=7$ applies
k) UL ($N_{UL}$ symbols), Guard period ($N_{guard}$ symbols), followed by DL ($N_{DL}$ symbols), followed by Unknown/reserved symbols ($N_{unknown}$ symbols)

$1<=N_{UL}<=4$, $1<=N_{guard}<=4$, $1<=N_{DL}<=4$, $1<=N_{unknown}<=4$, $N_{UL}+N_{guard}+N_{DL}+N_{unknown}=7$ applies l) UL ($N_{UL}$ symbols), followed by Unknown/reserved symbols ($N_{unknown}$ symbols), Guard period ($N_{guard}$ symbols), followed by DL ($N_{DL}$ symbols)

$1<=N_{UL}<=4$, $1<=N_{unknown}<=4$, $1<=N_{guard}<=4$, $1<=N_{DL}<=4$, $N_{UL}+N_{unknown}+N_{guard}+N_{DL}=7$ applies m) DL ($N_{DL}$ symbols), followed by Unknown ($N_{unknown\_1}$ symbols), followed by guard period ($N_{guard}$ symbols), followed by Unknown ($N_{unknown\_2}$ symbols), followed by UL symbols ($N_{UL}$ symbols)

$1<=N_{DL}<=3$, $1<=N_{unknown\_1}<=3$, $1<=N_{guard}<=3$, $1<=N_{unknown\_2}<=3$, $1<=N_{UL}<=3$, $N_{DL}+N_{guard}+N_{UL}+N_{unknown\_1}+N_{unknown\_2}=7$ applies n) DL ($N_{DL}$ symbols), followed by guard ($N_{guard}$ symbols), followed by Unknown ($N_{unknown}$ symbols)

$1<=N_{DL}<=5$, $1<=N_{guard}<=5$, $1<=N_{unknown}<=5$, $N_{DL}+N_{guard}+N_{unknown}=7$ applies o) DL ($N_{DL}$ symbols), followed by Unknown ($N_{unknown}$ symbols), followed by UL symbols ($N_{UL}$ symbols)

$1<=N_{DL}<=5$, $1<=N_{unknown}<=5$, $1<=N_{UL}<=5$, $N_{DL}+N_{unknown}+N_{UL}=7$ applies.

p) DL ($N_{DL}$ symbols), followed by Unknown ($N_{unknown}$ symbols)

$1<=N_{DL}<=6$, $1<=N_{unknown}<=6$, $N_{DL}+N_{unknown}=7$ applies.

q) UL ($N_{UL}$ symbols), followed by Unknown ($N_{unknown}$ symbols)

$1<=N_{UL}<=6$, $1<=N_{unknown}<=6$, $N_{UL}+N_{unknown}=7$ applies.

r) UL ($N_{UL}$ symbols), followed by DL symbols ($N_{DL}$ symbols), followed by Unknown ($N_{unknown}$ symbols), $1<=N_{UL}<=5$, $1<=N_{unknown}<=5$, $1<=N_{DL}<=5$, $N_{UL}+N_{unknown}+N_{DL}=7$ applies.

s) UL ($N_{UL}$ symbols), followed by Unknown ($N_{unknown}$ symbols), $1<=N_{UL}<=6$, $1<=N_{unknown}<=6$, $N_{UL}+N_{unknown}=7$ applies.

t) UL ($N_{UL}$ symbols), followed by DL symbols ($N_{DL}$ symbols), $1<=N_{UL}<=6$, $1<=N_{DL}<=6$, $N_{UL}+N_{unknown}=7$ applies.

U) Unknown ($N_{unknown}$ symbols), followed by UL symbols ($N_{UL}$ symbols), $1<=N_{unknown}<=6$, $1<=N_{UL}<=6$, $N_{unknown}+N_{UL}=7$ applies.

v) Unknown ($N_{unknown}$ symbols), followed by UL symbols ($N_{UL}$ symbols), followed by DL symbols ($N_{DL}$)

$1<=N_{unknown}<=5$, $1<=N_{UL}<=5$, $1<=N_{DL}<=5$, $N_{unknown}+N_{UL}+N_{DL}=7$ applies.

v) Unknown ($N_{unknown\_1}$ symbols), followed by UL symbols ($N_{UL}$ symbols), followed by DL symbols ($N_{DL}$), followed by unknown ($N_{unknown\_2}$ symbols)

$1<=N_{unknown\_1}<=4$, $1<=N_{UL}<=4$, $1<=N_{DL}<=4$, $1<=N_{unknown\_1}<=4$, $N_{unknown\_1}+N_{UL}+N_{DL}+N_{unknown\_2}=7$ applies.

As mentioned above, guard symbols may not be explicitly indicated in the format, only unknown is indicated. From mobile device perspective, behavior on symbols, referred to as unknown/guard/reserved/blank can be same which is not transmit and not receive.

Format Examples

Table 1 below lists a set of example half-slot formats/configurations. Each example is consistent with one of the above-summarized configurations, as indicated in the first column of the table. Each example indicates for each of the 7 symbols, whether the symbol is UL, DL, guard (G) or unknown/reserved UKWN). In some embodiments, a field in a GC-PDCCH carrying SFI can be used to indicate one of the formats/configurations of Table 1. More generally, a field in a GC-PDCCH carrying SFI can be used to indicate a format from a set of formats that includes at least one of the configurations of half-slot in Table 1. The indication can apply to one or multiple slots. Configuration/format of each half-slot can be indicated in separate fields in the GC-PDCCH. Alternatively, one field can be used to indicate SFI for the full slot, where formats based on both slot-based switching and half-slot based switching are indicated.

In Table 1, configuration examples based on half-slot are shown. In general, a format can indicate a pair formed from these configurations (including repetition) to indicate configuration for the full slot if a field is used to indicate SFI for the slot. Symbols identified as 'G' can be replaced by Unknown (UKWN) as well, as mentioned above if gap is not explicitly signaled.

TABLE 1

| Configuration Type | config index | symbol 0 | symbol 1 | symbol 2 | symbol 3 | symbol 4 | symbol 5 | symbol 6 |
|---|---|---|---|---|---|---|---|---|
| config c | 1 | DL | DL | DL | DL | DL | G | UL |
| config c | 2 | DL | DL | DL | DL | G | UL | UL |
| config c | 3 | DL | DL | DL | G | UL | UL | UL |
| config c | 4 | DL | DL | G | UL | UL | UL | UL |
| config c | 5 | DL | G | UL | UL | UL | UL | UL |
| config c | 6 | DL | DL | DL | DL | G | G | UL |
| config c | 7 | DL | DL | DL | G | G | UL | UL |
| config c | 8 | DL | DL | G | G | UL | UL | UL |
| config c | 9 | DL | G | G | UL | UL | UL | UL |
| config f | 10 | DL | DL | DL | DL | UKWN | G | UL |
| config f | 11 | DL | DL | DL | UKWN | G | UL | UL |
| config f | 12 | DL | DL | UKWN | G | UL | UL | UL |
| config f | 13 | DL | UKWN | G | UL | UL | UL | UL |
| config f | 14 | DL | DL | DL | UKWN | UKWN | G | UL |
| config f | 15 | DL | DL | UKWN | UKWN | G | UL | UL |
| config f | 16 | DL | UKWN | UKWN | G | UL | UL | UL |
| config h | 17 | DL | DL | DL | DL | G | UKWN | UL |
| config h | 18 | DL | DL | DL | G | UKWN | UL | UL |
| config h | 19 | DL | DL | G | UKWN | UL | UL | UL |
| config h | 20 | DL | G | UKWN | UL | UL | UL | UL |
| config h | 21 | DL | DL | DL | G | UKWN | UKWN | UL |
| config h | 22 | DL | DL | G | UKWN | UKWN | UL | UL |
| config h | 23 | DL | G | UKWN | UKWN | UL | UL | UL |
| config i | 24 | DL | DL | DL | DL | G | UL | UKWN |
| config i | 25 | DL | DL | DL | G | UL | UL | UKWN |
| config i | 26 | DL | DL | G | UL | UL | UL | UKWN |

Table 2A below lists a set of example slot formats with half-slot switching featuring repetition of the format between the two half-slots. Each example indicates for each of the 14 symbols, whether the symbol is UL, DL, guard (G) or unknown/reserved UKWN). In some embodiments, a field in a GC-PDCCH carrying SFI can be used to indicate one of the formats of Table 2. More generally, a field in a GC-PDCCH carrying SFI can be used to indicate a format from a set of formats that includes at least one of the formats of Table 2. The indication can apply to one or multiple slots. Symbols identified as 'G' can be replaced as 'UKWN', as mentioned in previous examples.

TABLE 2A

| format | symbol 0 | symbol 1 | symbol 2 | symbol 3 | symbol 4 | symbol 5 | symbol 6 | symbol 7 | symbol 8 | symbol 9 | symbol 10 | symbol 11 | symbol 12 | symbol 13 |
|---|---|---|---|---|---|---|---|---|---|---|---|---|---|---|
| 1 | DL | DL | DL | DL | DL | G | UL | DL | DL | DL | DL | DL | G | UL |
| 2 | DL | DL | DL | DL | G | UL | UL | DL | DL | DL | DL | G | UL | UL |
| 3 | DL | DL | DL | G | UL | UL | UL | DL | DL | DL | G | UL | UL | UL |
| 4 | DL | DL | G | UL | UL | UL | UL | DL | DL | G | UL | UL | UL | UL |
| 5 | DL | G | UL | UL | UL | UL | UL | DL | G | UL | UL | UL | UL | UL |
| 6 | DL | DL | DL | DL | G | G | UL | DL | DL | DL | DL | G | G | UL |
| 7 | DL | DL | DL | G | G | UL | UL | DL | DL | DL | G | G | UL | UL |
| 8 | DL | DL | G | G | UL | UL | UL | DL | DL | G | G | UL | UL | UL |
| 9 | DL | G | G | UL | UL | UL | UL | DL | G | G | UL | UL | UL | UL |
| 10 | DL | DL | DL | DL | UKWN | G | UL | DL | DL | DL | DL | UKWN | G | UL |
| 11 | DL | DL | DL | UKWN | G | UL | UL | DL | DL | DL | UKWN | G | UL | UL |
| 12 | DL | DL | UKWN | G | UL | UL | UL | DL | DL | UKWN | G | UL | UL | UL |
| 13 | DL | UKWN | G | UL | UL | UL | UL | DL | UKWN | G | UL | UL | UL | UL |
| 14 | DL | DL | DL | UKWN | UKWN | G | UL | DL | DL | DL | UKWN | UKWN | G | UL |
| 15 | DL | DL | UKWN | UKWN | G | UL | UL | DL | DL | UKWN | UKWN | G | UL | UL |
| 16 | DL | UKWN | UKWN | G | UL | UL | UL | DL | UKWN | UKWN | G | UL | UL | UL |
| 17 | DL | DL | DL | DL | G | UKWN | UL | DL | DL | DL | DL | G | UKWN | UL |
| 18 | DL | DL | DL | G | UKWN | UL | UL | DL | DL | DL | G | UKWN | UL | UL |
| 19 | DL | DL | G | UKWN | UL | UL | UL | DL | DL | G | UKWN | UL | UL | UL |
| 20 | DL | G | UKWN | UL | UL | UL | UL | DL | G | UKWN | UL | UL | UL | UL |
| 21 | DL | DL | DL | G | UKWN | UKWN | UL | DL | DL | DL | G | UKWN | UKWN | UL |
| 22 | DL | DL | G | UKWN | UKWN | UL | UL | DL | DL | G | UKWN | UKWN | UL | UL |
| 23 | DL | G | UKWN | UKWN | UL | UL | UL | DL | G | UKWN | UKWN | UL | UL | UL |
| 24 | DL | DL | DL | DL | G | UL | UKWN | DL | DL | DL | DL | G | UL | UKWN |
| 25 | DL | DL | DL | G | UL | UL | UKWN | DL | DL | DL | G | UL | UL | UKWN |
| 26 | DL | DL | G | UL | UL | UL | UKWN | DL | DL | G | UL | UL | UL | UKWN |

Table 2B below lists another set of example slot formats with half-slot switching featuring repetition of the format between the two half-slots. Each example indicates for each of the 14 symbols, whether the symbol is UL, DL, unknown (UKWN).

TABLE 2B

| format | symbol 0 | symbol 1 | symbol 2 | symbol 3 | symbol 4 | symbol 5 | symbol 6 | symbol 7 | symbol 8 | symbol 9 | symbol 10 | symbol 11 | symbol 12 | symbol 13 |
|---|---|---|---|---|---|---|---|---|---|---|---|---|---|---|
| 1 | DL | DL | DL | DL | DL | UKWN | UL | DL | DL | DL | DL | DL | UKWN | UL |
| 2 | DL | DL | DL | DL | UKWN | UL | UL | DL | DL | DL | DL | UKWN | UL | UL |
| 3 | DL | DL | UKWN | UL | UL | UL | UL | DL | DL | UKWN | UL | UL | UL | UL |
| 4 | DL | UKWN | UL | UL | UL | UL | UL | DL | UKWN | UL | UL | UL | UL | UL |
| 5 | DL | DL | DL | DL | UKWN | UKWN | UL | DL | DL | DL | DL | UKWN | UKWN | UL |
| 6 | DL | DL | UKWN | UKWN | UL | UL | UL | DL | DL | UKWN | UKWN | UL | UL | UL |
| 7 | DL | G | G | UL | UL | UL | UL | DL | G | G | UL | UL | UL | UL |

Note that each row of Table 2B is a row of Table 2A with G replaced by UKWN

Table 3 below lists a set of example slot formats with half-slot switching featuring different configurations in the two half-slots. Each example indicates for each of the 14 symbols, whether the symbol is UL, DL, guard (G) or unknown/reserved UKWN). In some embodiments, a field in a GC-PDCCH carrying SFI can be used to indicate one of the formats of Table 3. More generally, a field in GC-PDCCH carrying SFI can be used to indicate a format from a set of formats that includes at least one of the formats of Table 3. The indication can apply to one or multiple slots. Symbols identified as 'G' can be replaced as 'UKWN', as mentioned in previous examples.

TABLE 3

| format | symbol 0 | symbol 1 | symbol 2 | symbol 3 | symbol 4 | symbol 5 | symbol 6 | symbol 7 | symbol 8 | symbol 9 | symbol 10 | symbol 11 | symbol 12 | symbol 13 |
|---|---|---|---|---|---|---|---|---|---|---|---|---|---|---|
| 1 | DL | DL | DL | DL | DL | G | UL | DL | DL | DL | DL | G | UL | UL |
| 2 | DL | DL | DL | DL | DL | G | UL | DL | G | UL | UL | UL | UL | UL |
| 3 | DL | G | UL | UL | UL | UL | UL | DL | DL | DL | DL | DL | G | UL |
| 4 | DL | DL | G | UL | UL | UL | UL | DL | G | UL | UL | UL | UL | UL |
| 5 | DL | DL | G | UL | UL | UL | UL | DL | DL | DL | DL | DL | G | UL |
| 6 | DL | DL | DL | G | UL | UL | UL | DL | G | UL | UL | UL | UL | UL |
| 7 | DL | G | UL | UL | UL | UL | UL | DL | DL | DL | G | UL | UL | UL |
| 8 | DL | DL | DL | DL | DL | G | UL | DL | DL | G | UL | UL | UL | UL |
| 9 | DL | DL | G | UL | UL | UL | UL | DL | DL | DL | DL | DL | G | UL |

In another embodiment, the GC-PDCCH carrying SFI contains M fields, where each field indicates a format to be used for a respective group of one or more slots within a group of L slots, 1<=M<L. For example, indicators based on one or more of tables 1, 2 or 3 above may be used for each group.

In some embodiments, a single table includes both 7-symbol-based switching and 14-symbol-based switching formats. For example there could be a higher layer configured or pre-defined table with J supported formats. A field in the GC-PDCCH carrying SFI can be used to indicate one of the J formats. Alternatively, there can be M fields, where each field indicate a format to be used for a respective group of at least one slot, where the scope of GC-DCI indicating SFI is L slots, 1<=M<L. An example is shown in FIG. 10 which shows a set of formats with 14 symbol-based switching and a set of formats with 7 symbol-based switching. The formats based on 7 symbol or half-slot based switching may include repetition, or different configurations for two half-slots.

Figure 11:
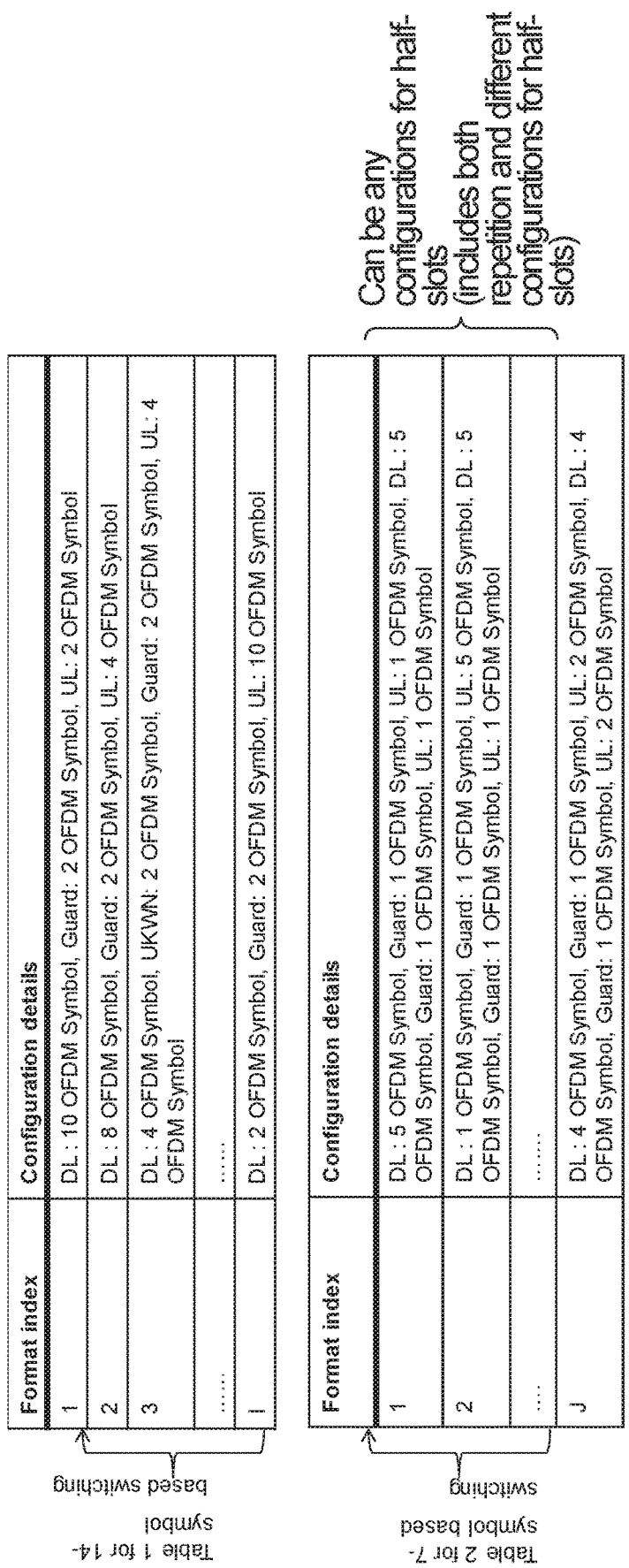
FIG. 11 is an example of a set of formats that includes a first table containing some formats based on half-slot switching and a second table containing formats based on full slot switching.

In some embodiments, separate tables are used for indicating 7-symbol based switching and 14-symbol based switching. In a specific example, there are a total of I formats for switching per 14 symbols defined in a first table, and a total of J formats for switching per 7 symbols, per half-slot in a second table. FIG. 11 shows an example of this approach.

In some embodiments, a single GC-PDCCH may be used to indicate a format selected from either table. A field could be implemented with $\log_2$ (max (I, J)) bits to indicate the slot format, where if I=J, then $\log_2$ I bits are used. An additional field may be employed to indicate which table is being used for the indicated format.

In some embodiments, separate GC-PDCCHs are used to indicate formats in the two tables (14 symbol and 7 symbol-based switching). A given mobile device may be configured to monitor one type or both GC-PDCCHs.

If a mobile device monitors both type, corresponding GC-PDCCHs may be received in same or different control resource sets (CORESETs).

In another embodiment, three tables are used. A first table contains formats for one switching per slot. A second table contains formats for two switching per slot, same or mirror (or otherwise correlated) formats in each half-slot. A third table lists formats for two switchings per slot, with different formats in each half-slot.

In some embodiments, one GC-PDCCH is used to indicate format from all tables: a field can be used to indicate a configuration/format with $\log_2$ (max (I, J, K)) bits, where if I=K=J, then $\log_2$ I bits are used. An additional field may be included to indicate which table is being used. For example, this additional field may have 2 bits, 00→First Table, 01→Second Table (repetition), 10→Second Table (Mirror), 11→Third Table 3.

In some embodiments, separate GC-PDCCHs are used to indicate formats from each of the first, second and third table. The GC-PDCCH may include a field or flag for the second table to indicate mirror or repetition.

In some embodiment, "GP" may not be explicitly indicated in SFI. In which case, "GP" may be indicated as "unknown". And mobile device may rely on other ways to obtain whether this symbol is a gap (GP) or not. For all the format described here in this disclosure, GP can be replaced by "unknown".

In one embodiment, all the formats and configuration mentioned above can be indicated semi-statically, e.g., by RRC signaling or system information, to the UE, instead of in a PDCCH.

In the above described embodiments, there are K switching point per slot. In some embodiment, we there re K switching point per half slot, some examples are described below.

In one embodiment, there can be more than one switching point within a first duration of a slot, e.g., first duration can be half-slot, the half slot can be the first half slot or the second half slot. In one example, a configuration of the duration with multiple switching points can be shown as: DL ($N_{DL,1}$ symbols), followed by Unknown ($N_{unknown,1}$ symbols), followed by UL symbols ($N_{UL,1}$ symbols), followed by DL ($N_{DL,2}$ symbols), followed by Unknown ($N_{unknown,2}$ symbols), followed by UL symbols ($N_{UL,2}$ symbols), where $0<=\{N_{DL,1}, N_{unknown,1}, N_{UL,1}, N_{DL,2}, N_{unknown,2}, N_{UL,2}\}<=5$, where $N_{DL,1}+N_{unknown,1}+N_{UL,1}+N_{DL,2}+N_{unknown,2}+N_{UL,2}=7$ applies if the number of symbols in the first duration is 7.

In the following, a table is provided where half-slot comprises multiple switching points. The entries shown below are just examples, it should be appreciated that other different configurations with multiple switching are also possible. Configurations of first and second half-slot can be same or different in the indicated SFI.

| format | symbol 0 | symbol 1 | symbol 2 | symbol 3 | symbol 4 | symbol 5 | symbol 6 | symbol 7 | symbol 8 | symbol 9 | symbol 10 | symbol 11 | symbol 12 | symbol 13 |
|---|---|---|---|---|---|---|---|---|---|---|---|---|---|---|
| 1 | DL | UKWN | UL | DL | DL | UKWN | UL | DL | UKWN | UL | DL | DL | UKWN | UL |
| 2 | DL | UKWN | UL | DL | UKWN | UL | UL | DL | UKWN | UL | DL | UKWN | UL | UL |
| 3 | DL | UKWN | UL | UL | DL | UKWN | UL | DL | UKWN | UL | DL | DL | UKWN | UL |
| 4 | DL | DL | UKWN | UL | DL | UKWN | UL | DL | DL | UKWN | UL | DL | UKWN | UL |

| format | symbol 0 | symbol 1 | symbol 2 | symbol 3 | symbol 4 | symbol 5 | symbol 6 | symbol 7 | symbol 8 | symbol 9 | symbol 10 | symbol 11 | symbol 12 | symbol 13 |
|---|---|---|---|---|---|---|---|---|---|---|---|---|---|---|
| 5 | DL | UKWN | UL | DL | UKWN | UKWN | UL | DL | UKWN | UKWN | UL | DL | UKWN | UL |
| 6 | DL | UKWN | UKWN | UL | DL | UKWN | UL | DL | UKWN | UL | DL | UKWN | UKWN | UL |
| 7 | DL | UKWN | UL | UL | DL | UKWN | UL | DL | UKWN | UL | DL | DL | UKWN | UL |
| 8 | DL | UKWN | UL | DL | UKWN | UKWN | UL | DL | DL | UKWN | UL | DL | UKWN | UL |

SFI and Numerology

In some embodiments, the SFI indicated is based on a default/reference numerology. Slot formats for other active/coexisting numerologies are derived based on a scalable relationship. For example, for FDM of numerologies, the switching points are aligned across numerologies within a carrier. SFI may only be received in GC-PDCCH in the CORESET configured with reference numerology or SFI may be received for each numerology.

Figure 12A:
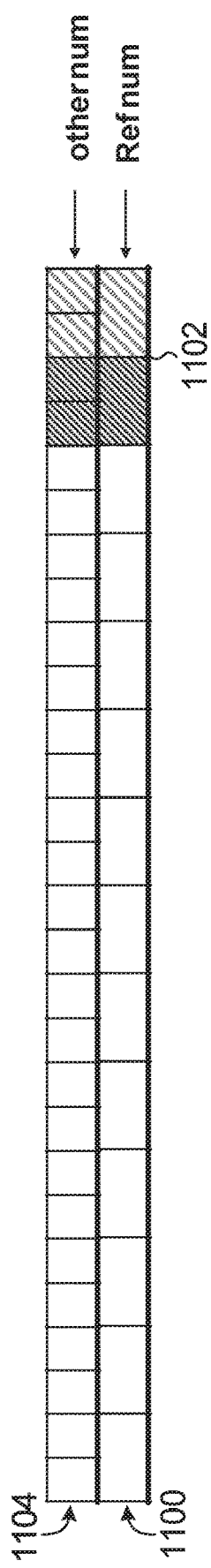
FIGS. 12A and 12B show two examples of a slot having 14 symbols in accordance with a reference numerology where switching points are aligned across two numerologies.
Figure 12B:
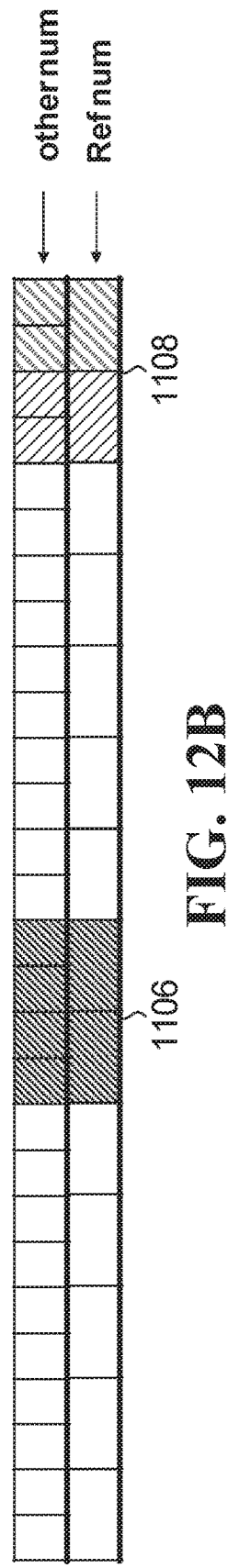

FIG. 12A shows an example of a slot having 14 symbols in accordance with a reference numerology, indicated at 1100. In the illustrated example, there is one switching point 1102. Also shown are 28 symbols of another numerology, indicated at 1104, that have a scalable relationship with reference numerology in that two symbols of the second numerology occupy the same time period as one symbol of the reference numerology. The switching point is aligned across the two numerologies. FIG. 12B shows a second example with two switching points 1106,1108 that each are aligned across the two numerologies.

In one example, SFI is indicated based on a reference or current active numerology used in the carrier or active bandwidth part. If there is a switch in numerology, i.e., if a mobile device switches from one bandwidth part associated with a first numerology to a second bandwidth part associated with a second numerology based L1 signaling such as PDCCH, mobile device may receive updated SFI in the common search space of new bandwidth part for slot formats based on second numerology. The PDCCH received in the first bandwidth may indicate second bandwidth part to the UE, which is associated with a different numerology. In that case, mobile device may be configured to find the GC-PDCCH carrying SFI at the first possible common search space location within the second bandwidth part.

Figure 13:
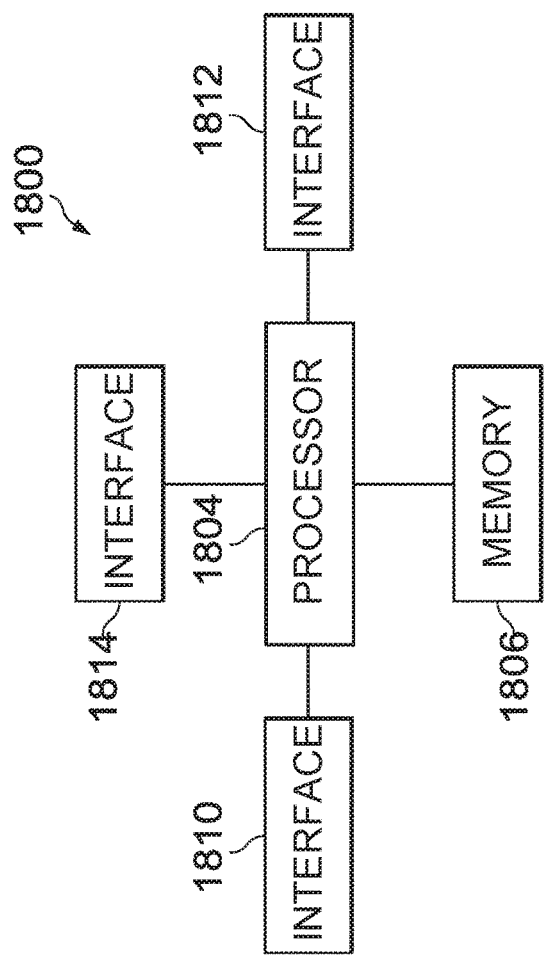
FIG. 13 is a block diagram of an embodiment processing system for performing methods described herein.

FIG. 13 is a block diagram of an embodiment processing system 1800 for performing methods described herein, which may be installed in a host device. As shown, the processing system 1800 includes a processor 1804, a memory 1806, and interfaces 1810-1814, which may (or may not) be arranged as shown in FIG. 13. The processor 1804 may be any component or collection of components adapted to perform computations and/or other processing related tasks, and the memory 1806 may be any component or collection of components adapted to store programming and/or instructions for execution by the processor 1804. In an embodiment, the memory 1806 includes a non-transitory computer readable medium. The interfaces 1810, 1812, 1814 may be any component or collection of components that allow the processing system 1800 to communicate with other devices/components and/or a user. For example, one or more of the interfaces 1810, 1812, 1814 may be adapted to communicate data, control, or management messages from the processor 1804 to applications installed on the host device and/or a remote device. As another example, one or more of the interfaces 1810, 1812, 1814 may be adapted to allow a user or user device (e.g., personal computer (PC), etc.) to interact/communicate with the processing system 1800. The processing system 1800 may include additional components not depicted in FIG. 13, such as long term storage (e.g., non-volatile memory, etc.).

In some embodiments, the processing system 1800 is included in a network device that is accessing, or part otherwise of, a telecommunications network. In one example, the processing system 1800 is in a network-side device in a wireless or wireline telecommunications network, such as a base station, a relay station, a scheduler, a controller, a gateway, a router, an applications server, or any other device in the telecommunications network. In such embodiments, the processing system is configured to transmit an SFI using one of the methods described herein, and to transmit and receive in accordance with the SFI.

In other embodiments, the processing system 1800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network. In such embodiments, the processing system is configured to receive an SFI using one of the methods described herein, and to transmit and receive in accordance with the SFI.

In some embodiments, one or more of the interfaces 1810, 1812, 1814 connects the processing system 1800 to a transceiver adapted to transmit and receive signaling over the telecommunications network.

Figure 14:
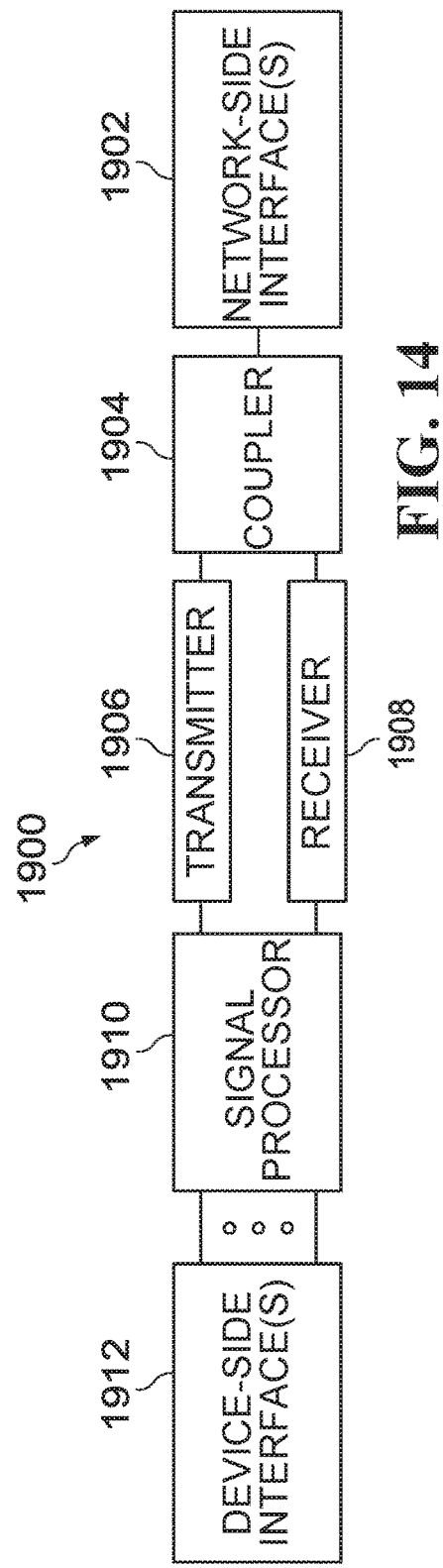
FIG. 14 is a block diagram of a transceiver adapted to transmit and receive signaling over a telecommunications network in accordance with one or more of the methods described herein.

FIG. 14 is a block diagram of a transceiver 1900 adapted to transmit and receive signaling over a telecommunications network. The transceiver 1900 may be installed in a host device. As shown, the transceiver 1900 comprises a network-side interface 1902, a coupler 1904, a transmitter 1906, a receiver 1908, a signal processor 1910, and device-side interface(s) 1912. The network-side interface 1902 may include any component or collection of components adapted to transmit or receive signaling over a wireless or wireline telecommunications network. The coupler 1904 may include any component or collection of components adapted to facilitate bi-directional communication over the network-side interface 1902. The transmitter 1906 may include any component or collection of components (e.g., up-converter, power amplifier, etc.) adapted to convert a baseband signal into a modulated carrier signal suitable for transmission over the network-side interface 1902. The receiver 1908 may include any component or collection of components (e.g., down-converter, low noise amplifier, etc.) adapted to convert a carrier signal received over the network-side interface 1902 into a baseband signal. The signal processor 1910 may include any component or collection of components adapted to convert a baseband signal into a data signal suitable for communication over the device-side interface(s) 1912, or vice-versa. The device-side interface(s) 1912 may include any component or collection of components adapted to communicate data-signals between the signal processor

1910 and components within the host device (e.g., the processing system 1800, local area network (LAN) ports, etc.).

The transceiver 1900 may transmit and receive signaling over any type of communications medium. In some embodiments, the transceiver 1900 transmits and receives signaling over a wireless medium. For example, the transceiver 1900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1902 comprises one or more antenna/radiating elements. For example, the network-side interface 1902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Figure 15:
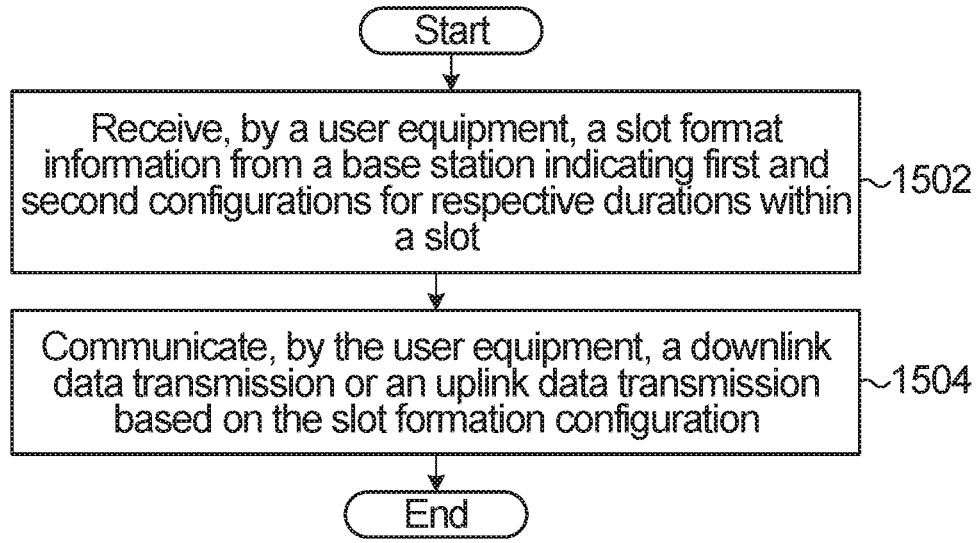
FIG. 15 is a flowchart of a method of communication from the perspective of a user equipment.

FIG. 15 is a flowchart of a method of wireless communication. The method begins in block 1500 with receiving, by a user equipment, a slot format information from a base station. The SFI indicates at least one slot formation configuration, each of the at least slot formation configuration comprises a first configuration associated with symbols within a first duration of one slot and a second configuration associated with symbols within a second duration of the slot, the first configuration indicates location of at least one uplink symbol and location of at least one downlink symbol, and the second configuration indicates location of at least one uplink symbol and location of at least one downlink symbol. The first configuration comprises at least one first switching point in a first half slot and the second configuration comprises at least a second switching point in a second half slot. The method continues in block 1502 with communicating, by the user equipment, a downlink data transmission or an uplink data transmission based on the slot formation configuration.

Figure 16:
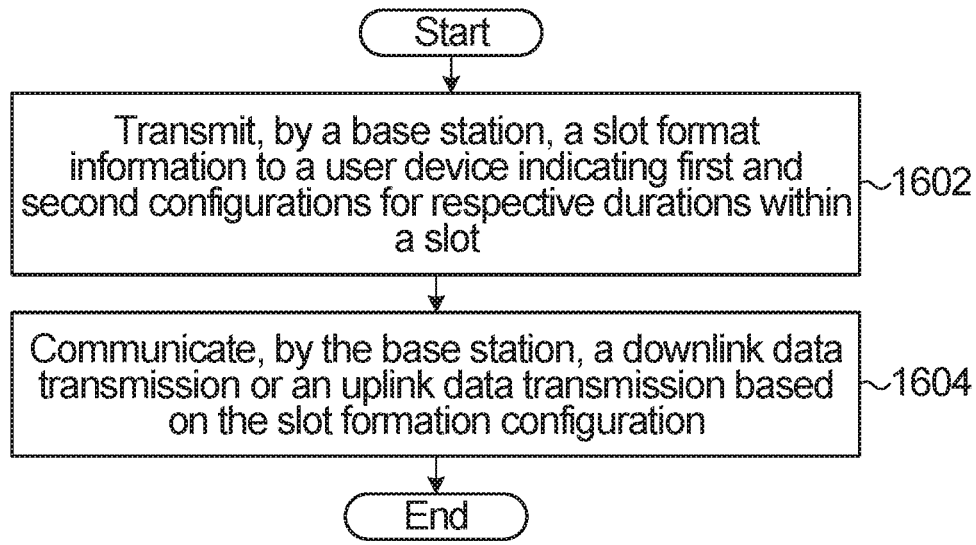
FIG. 16 is a flowchart of a method of communication from the perspective of a base station.

FIG. 16 is a flowchart of another method of wireless communications. The method begins in block 1600 with transmitting, by a base station (BS), a slot format information (SFI) to a user equipment. The SFI indicates at least one slot formation configuration, each of the at least slot formation configuration comprises a first configuration associated with symbols within a first duration of one slot and a second configuration associated with symbols within a second duration of the slot, the first configuration indicates location of at least one uplink symbol and location of at least one downlink symbol, and the second configuration indicates location of at least one uplink symbol and location of at least one downlink symbol. The first configuration comprises at least one first switching point in a first half slot and the second configuration comprises at least a second switching point in a second half slot. The method continues in block 1602 with communicating, by the base station, a downlink data transmission or an uplink data transmission based on the slot formation configuration.

FIG. 15 is a method from the UE perspective and FIG. 16 is a method from the network perspective. A method from an overall system perspective is realized by combining the methods of FIGS. 15 and 16. The two methods can make use of any of the specific options for the SFI detailed above. In some embodiments the UE of FIG. 13 is configured to implement the method of FIG. 15, and the base station of FIG. 14 is configured to implement the method of FIG. 16. Again, the UE or base station can be configured to make use of any of the specific options for the SFI detailed above.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

According to one aspect of the present invention, there is provided a method of wireless communication, the method comprising: receiving, by a user device, a slot format information (SFI) from a base station (BS); wherein the SFI indicates at least one slot formation configuration, each of the at least slot formation configuration comprises a first configuration associated with symbols within a first duration of one slot and a second configuration associated with symbols within a second duration of the slot, and the first configuration and the second configuration indicates location of at least one uplink symbol and location of at least one downlink symbol; communicating, by the user device, a downlink data transmission or uplink data transmission based on the slot formation configuration.

Optionally, in any of the preceding embodiments the first configuration comprises at least one first switching point in a first half slot and the second configuration comprises at least a second switching point in a second half slot.

Optionally, in any of the preceding embodiments the first switching point and the second switching point indicate switching from downlink transmission direction to uplink transmission direction; or indicate switching from uplink transmission direction to downlink transmission direction.

Optionally, in any of the preceding embodiments the first switching point and the second switching point indicates location of at least one guard symbol or location of one or more unknown symbols.

Optionally, in any of the preceding embodiments further comprising: obtaining, by the user device, the first configuration and the second configuration from the SFI based on a predefined relationship; or directly obtaining, by the user device at least one slot formation configuration from the SFI.

Optionally, in any of the preceding embodiments the SFI indicates at least one slot formation configuration for a slot or a group of slots.

Optionally, in any of the preceding embodiments each slot has 14 symbols, and each of the first and second durations is 7 symbols.

Optionally, in any of the preceding embodiments the first configuration and the second configuration have the same configuration in the first duration and the second duration.

Optionally, in any of the preceding embodiments receiving a slot format information comprises monitoring a group common physical downlink control channel (GC-PDCCH).

Optionally, in any of the preceding embodiments receiving a slot format information comprises monitoring a group common control signal.

Optionally, in any of the preceding embodiments receiving a slot format information comprises monitoring a semi-static signal such as RRC signaling.

Optionally, in any of the preceding embodiments the slot format information indicates one of a plurality of configurations stored by the user device.

Optionally, in any of the preceding embodiments the method further comprises receiving signaling defining the plurality of configurations.

Optionally, in any of the preceding embodiments the received slot format information refers to a format or formats in one or both of a first and a second table, the first table containing slot formats with 7-symbol duration for use in configuring the first and second duration of a slot and the second table containing slot formats with 14-symbol for use in configuring an entire slot.

Optionally, in any of the preceding embodiments the received slot format information indicates that the format is from the first table, or indicates that the format is from the second table.

Optionally, in any of the preceding embodiments the received slot format information refers to a format in a table containing slot formats with 7-symbol based switching and also containing slot formats with 14-symbol based switching.

Optionally, in any of the preceding embodiments the received slot format information indicates a format for the first duration, and indicates the format of the second duration is the same as the format for the first duration.

Optionally, the received slot format information indicates a format for the first duration, and indicates the format of the second duration is a mirror of the format for the first duration.

According to another aspect of the present invention, there is provided a user device comprising a processor and memory configured to implement the methods as described herein.

According to another aspect of the present invention, there is provided a method of wireless communication, the method comprising: transmitting, by a base station (BS), a slot format information (SFI) to a user device; wherein the SFI indicates at least one slot formation configuration, each of the at least slot formation configuration comprises a first configuration associated with symbols within a first duration of one slot and a second configuration associated with symbols within a second duration of the slot, and the first configuration and the second configuration indicates location of at least one uplink symbol and location of at least one downlink symbol; communicating, by the base station, a downlink data transmission or uplink data transmission based on the slot formation configuration.

Optionally, in any of the preceding embodiments the first configuration comprises at least one first switching point in a first half slot and the second configuration comprises at least a second switching point in a second half slot.

Optionally, in any of the preceding embodiments the first switching point and the second switching point indicate switching from downlink transmission direction to uplink transmission direction; or indicate switching from uplink transmission direction to downlink transmission direction.

Optionally, in any of the preceding embodiments the first switching point and the second switching point indicates location of at least one guard symbol or location of one or more unknown symbols.

Optionally, in any of the preceding embodiments the first configuration and the second configuration from the SFI are based on a predefined relationship.

Optionally, in any of the preceding embodiments the SFI indicates at least one slot formation configuration for a slot or a group of slots.

Optionally, in any of the preceding embodiments each slot has 14 symbols, and each of the first and second durations is 7 symbols.

Optionally, in any of the preceding embodiments the first configuration and the second configuration have the same configuration in the first duration and the second duration.

Optionally, in any of the preceding embodiments transmitting a slot format information comprises transmitting a group common physical downlink control channel (GC-PDCCH).

Optionally, in any of the preceding embodiments transmitting a slot format information comprises transmitting a group common control signal.

Optionally, in any of the preceding embodiments transmitting a slot format information comprises transmitting a semi-static signal such as RRC signaling.

Optionally, in any of the preceding embodiments the slot format information indicates one of a plurality of configurations stored by the user device.

Optionally, in any of the preceding embodiments the method further comprises transmitting signaling defining the plurality of configurations.

Optionally, in any of the preceding embodiments the transmitted information refers to a format or formats in one or both of a first and a second table, the first table containing slot formats with 7-symbol duration for use in configuring the first and second duration of a slot and the second table containing slot formats with 14-symbol for use in configuring an entire slot.

Optionally, in any of the preceding embodiments the transmitted slot format information indicates that the format is from the first table, or indicates that the format is from the second table.

Optionally, in any of the preceding embodiments the transmitted slot format information refers to a format in a table containing slot formats with 7-symbol based switching and also containing slot formats with 14-symbol based switching.

Optionally, in any of the preceding embodiments the transmitted slot format information indicates a format for the first duration, and indicates the format of the second duration is the same as the format for the first duration.

Optionally, in any of the preceding embodiments the transmitted slot format information indicates a format for the first duration, and indicates the format of the second duration is a mirror of the format for the first duration.

According to another aspect of the present invention, there is provided a base station comprising a processor and memory configured to implement the methods as described herein.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
   receiving, by an apparatus, a slot format information (SFI) from a base station (BS),
   wherein the SFI indicates at least one slot formation configuration, each of the at least one slot formation configuration comprises a first configuration associated with symbols within a first half of a slot and a second configuration associated with symbols within a second half of the slot, the first configuration indicates location of first at least one uplink symbol and location of first at least one downlink symbol, and the second configuration indicates location of second at least one uplink symbol and location of second at least one downlink symbol;

obtaining, by the apparatus, the first configuration and the second configuration from the SFI based on a predefined relationship without receiving the predefined relationship from the BS, wherein the predefined relationship defines the first configuration and the second configuration having the same configuration in the first half of the slot and the second half of the slot; and communicating, by the apparatus, a downlink data transmission or an uplink data transmission based on the at least one slot formation configuration.

2. The method of claim 1, wherein the SFI indicates the at least one slot formation configuration for the slot or a group of slots.

3. The method of claim 1, wherein the receiving the slot format information comprises monitoring any one of the following:
- a group common physical downlink control channel (GC-PDCCH),
- a group common control signal, or
- a semi-static signal.

4. The method of claim 1, wherein each of the at least one slot formation configuration has a format from a set of formats that includes at least one of formats of the following table:

| format | symbol 0 | symbol 1 | symbol 2 | symbol 3 | symbol 4 | symbol 5 | symbol 6 | symbol 7 | symbol 8 | symbol 9 | symbol 10 | symbol 11 | symbol 12 | symbol 13 |
|---|---|---|---|---|---|---|---|---|---|---|---|---|---|---|
| 1 | DL | DL | DL | DL | DL | UKWN | UL | DL | DL | DL | DL | DL | UKWN | UL |
| 2 | DL | DL | DL | DL | UKWN | UL | UL | DL | DL | DL | DL | UKWN | UL | UL |
| 3 | DL | DL | UKWN | UL | UL | UL | UL | DL | DL | UKWN | UL | UL | UL | UL |
| 4 | DL | UKWN | UL | UL | UL | UL | UL | DL | UKWN | UL | UL | UL | UL | UL |
| 5 | DL | DL | DL | DL | UKWN | UKWN | UL | DL | DL | DL | DL | UKWN | UKWN | UL |
| 6 | DL | DL | UKWN | UKWN | UL | UL | UL | DL | DL | UKWN | UKWN | UL | UL | UL |
| 7 | DL | UKWN | UKWN | UL | UL | UL | UL | DL | UKWN | UKWN | UL | UL | UL | UL | wherein a symbol identified as "UKWN" is capable of being overridden by a DL symbol or an UL symbol by a dynamic signaling.

5. The method of claim 1, wherein the first configuration comprises at least one first switching point in the first half of the slot, and wherein the second configuration comprises at least one second switching point in the second half of the slot.

6. The method of claim 5, wherein the at least one first switching point and the at least one second switching point are based on 14-symbol and 7-symbol switching.

7. The method of the claim 5, wherein each of the at least one first switching point and the at least one second switching point of the second configuration indicates switching from a downlink transmission direction to an uplink transmission direction; or each of the at least one first switching point and the at least one second switching point indicates switching from the uplink transmission direction to the downlink transmission direction.

8. The method of claim 7, wherein the at least one first switching point and the at least one second switching point indicates location of at least one guard symbol or location of one or more unknown symbols.

9. The method of claim 1, wherein two symbols of another numerology occupy the same time period as one symbol of a reference numerology.

10. The method of claim 1, wherein the SFI is indicated based on a reference numerology, the reference numerology having a scalable relationship with another numerology.

11. The method of claim 1, the obtaining comprising:
obtaining the first configuration and the second configuration from the SFI based on the predefined relationship without receiving a predefined table indicating the predefined relationship from the BS.

12. An apparatus comprising:
at least one processor; and
a non-transitory computer readable storage medium storing programming, the programming including instructions that, when executed by the at least one processor, cause the apparatus to:
receive a slot format information (SFI) from a base station (BS),
wherein the SFI indicates at least one slot formation configuration, each of the at least one slot formation configuration comprises a first configuration associated with symbols within a first half of a slot and a second configuration associated with symbols within a second half of the slot, the first configuration indicates location of first at least one uplink symbol and location of first at least one downlink symbol, and the second configuration indicates location of second at least one uplink symbol and location of second at least one downlink symbol;
obtain the first configuration and the second configuration from the SFI based on a predefined relationship without receiving the predefined relationship from the BS, wherein the predefined relationship defines the first configuration and the second configuration having the same configuration in the first half of the slot and the second half of the slot; and
communicate a downlink data transmission or an uplink data transmission based on at least one slot formation configuration.

13. The apparatus of claim 12, wherein the at least one processor configured to receive the SFI comprises monitoring any one of the following:
a group common physical downlink control channel (GC-PDCCH),
a group common control signal, or
a semi-static signal.

14. The apparatus of claim 12, wherein each of the at least one slot formation configuration has a format from a set of formats that includes at least one of formats of the following table:

| format | symbol 0 | symbol 1 | symbol 2 | symbol 3 | symbol 4 | symbol 5 | symbol 6 | symbol 7 | symbol 8 | symbol 9 | symbol 10 | symbol 11 | symbol 12 | symbol 13 |
|---|---|---|---|---|---|---|---|---|---|---|---|---|---|---|
| 1 | DL | DL | DL | DL | DL | UKWN | UL | DL | DL | DL | DL | DL | UKWN | UL |
| 2 | DL | DL | DL | DL | UKWN | UL | UL | DL | DL | DL | DL | UKWN | UL | UL |
| 3 | DL | DL | UKWN | UL | UL | UL | UL | DL | DL | UKWN | UL | UL | UL | UL |
| 4 | DL | UKWN | UL | UL | UL | UL | UL | DL | UKWN | UL | UL | UL | UL | UL |
| 5 | DL | DL | DL | DL | UKWN | UKWN | UL | DL | DL | DL | DL | UKWN | UKWN | UL |
| 6 | DL | DL | UKWN | UKWN | UL | UL | UL | DL | DL | UKWN | UKWN | UL | UL | UL |
| 7 | DL | UKWN | UKWN | UL | UL | UL | UL | DL | UKWN | UKWN | UL | UL | UL | UL | wherein a symbol identified as "UKWN" is capable of being overridden by a DL symbol or an UL symbol by a dynamic signaling.

15. The apparatus of claim 12, wherein the first configuration comprises at least one first switching point in the first half of the slot, and wherein the second configuration comprises at least one second switching point in the second half of the slot.

16. The apparatus of claim 15, wherein the at least one first switching point and the at least one second switching point are based on 14-symbol and 7-symbol switching.

17. The apparatus of claim 15, wherein each of the at least one first switching point and the at least one second switching point of the second configuration indicates switching from a downlink transmission direction to an uplink transmission direction; or each of the at least one first switching point and the at least one second switching point indicates switching from the uplink transmission direction to the downlink transmission direction.

18. The apparatus of claim 17, wherein the at least one first switching point and the at least one second switching point indicates location of at least one guard symbol or location of one or more unknown symbols.

19. The apparatus of claim 12, wherein two symbols of another numerology occupy the same time period as one symbol of a reference numerology.

20. The apparatus of claim 12, wherein the SFI is indicated based on a reference numerology, the reference numerology having a scalable relationship with another numerology.

21. A method comprising:
transmitting, by a base station (BS), a slot format information (SFI) to a user equipment;
wherein the SFI indicates at least one slot formation configuration, each of the at least one slot formation configuration comprises a first configuration associated with symbols within a first half of a slot and a second configuration associated with symbols within a second half of the slot, the first configuration indicates location of first at least one uplink symbol and location of first at least one downlink symbol, and the second configuration indicates location of second at least one uplink symbol and location of second at least one downlink symbol, and
wherein the first configuration and the second configuration are indicated by the SFI based on a predefined relationship without the BS transmitting the predefined relationship to the user equipment, and wherein the predefined relationship defines the first configuration and the second configuration having the same configuration in the first half of the slot and the second half of the slot; and
communicating, by the base station, a downlink data transmission or an uplink data transmission based on the at least one slot formation configuration.

22. The method of claim 21, wherein the SFI indicates the at least one slot formation configuration for the slot or a group of slots.

23. The method of claim 21 wherein transmitting the SFI comprises transmitting any one of the following:
a group common physical downlink control channel (GC-PDCCH),
a group common control signal,
a semi-static signal, or
RRC signaling.

24. The method of claim 21, wherein each of the at least one slot formation configuration has a format from a set of formats that includes at least one of formats of the following table:

| format | symbol 0 | symbol 1 | symbol 2 | symbol 3 | symbol 4 | symbol 5 | symbol 6 | symbol 7 | symbol 8 | symbol 9 | symbol 10 | symbol 11 | symbol 12 | symbol 13 |
|---|---|---|---|---|---|---|---|---|---|---|---|---|---|---|
| 1 | DL | DL | DL | DL | DL | UKWN | UL | DL | DL | DL | DL | DL | UKWN | UL |
| 2 | DL | DL | DL | DL | UKWN | UL | UL | DL | DL | DL | DL | UKWN | UL | UL |
| 3 | DL | DL | UKWN | UL | UL | UL | UL | DL | DL | UKWN | UL | UL | UL | UL |
| 4 | DL | UKWN | UL | UL | UL | UL | UL | DL | UKWN | UL | UL | UL | UL | UL |
| 5 | DL | DL | DL | DL | UKWN | UKWN | UL | DL | DL | DL | DL | UKWN | UKWN | UL |

| format | symbol 0 | symbol 1 | symbol 2 | symbol 3 | symbol 4 | symbol 5 | symbol 6 | symbol 7 | symbol 8 | symbol 9 | symbol 10 | symbol 11 | symbol 12 | symbol 13 |
|---|---|---|---|---|---|---|---|---|---|---|---|---|---|---|
| 6 | DL | DL | UKWN | UKWN | UL | UL | UL | DL | DL | UKWN | UKWN | UL | UL | UL |
| 7 | DL | UKWN | UKWN | UL | UL | UL | UL | DL | UKWN | UKWN | UL | UL | UL | UL | wherein a symbol identified as "UKWN" is capable of being overridden by a DL symbol or an UL symbol by dynamic signaling.

25. The method of claim 21, wherein the first configuration comprises at least one first switching point in the first half of the slot, and wherein the second configuration comprises at least one second switching point in the second half of the slot.

26. The method of claim 25, wherein the at least one first switching point and the at least one second switching point are based on 14-symbol and 7-symbol switching.

27. The method of the claim 25, wherein each of the at least one first switching point and the at least one second switching point of the second configuration indicates switching from a downlink transmission direction to an uplink transmission direction; or each of the at least one first switching point and the at least one second switching point indicates switching from the uplink transmission direction to the downlink transmission direction.

28. The method of claim 27, wherein the at least one first switching point and the at least one second switching point indicates location of at least one guard symbol or location of one or more unknown symbols.

29. The method of claim 21, wherein two symbols of another numerology occupy the same time period as one symbol of a reference numerology.

30. The method of claim 21, wherein the SFI is indicated based on a reference numerology, the reference numerology having a scalable relationship with another numerology.

31. A base station comprising:
at least one processor; and
a non-transitory computer readable storage medium storing programming, the programming including instructions that, when executed by the at least one processor, cause the base station to:
transmit a slot format information (SFI) to a user equipment,
wherein the SFI indicates at least one slot formation configuration, each of the at least one slot formation configuration comprises a first configuration associated with symbols within a first half of a slot and a second configuration associated with symbols within a second half of the slot, the first configuration indicates location of first at least one uplink symbol and location of first at least one downlink symbol, and the second configuration indicates location of second at least one uplink symbol and location of second at least one downlink symbol, and wherein the first configuration and the second configuration are indicated by the SFI based on a predefined relationship without the base station transmitting the predefined relationship to the user equipment, and wherein the predefined relationship defines the first configuration and the second configuration having the same configuration in the first half of the slot and the second half of the slot; and communicate a downlink data transmission or an uplink data transmission based on at least one slot formation configuration.

32. The base station of the claim 31, wherein the at least one processor configured to send the SFI comprises monitoring any one of the following:
a group common physical downlink control channel (GC-PDCCH),
a group common control signal, or
a semi-static signal.

33. The base station of claim 31, wherein each of the at least one slot formation configuration has a format from a set of formats that includes at least one of formats of the following table:

| format | symbol 0 | symbol 1 | symbol 2 | symbol 3 | symbol 4 | symbol 5 | symbol 6 | symbol 7 | symbol 8 | symbol 9 | symbol 10 | symbol 11 | symbol 12 | symbol 13 |
|---|---|---|---|---|---|---|---|---|---|---|---|---|---|---|
| 1 | DL | DL | DL | DL | DL | UKWN | UL | DL | DL | DL | DL | DL | UKWN | UL |
| 2 | DL | DL | DL | DL | UKWN | UL | UL | DL | DL | DL | DL | UKWN | UL | UL |
| 3 | DL | DL | UKWN | UL | UL | UL | UL | DL | DL | UKWN | UL | UL | UL | UL |
| 4 | DL | UKWN | UL | UL | UL | UL | UL | DL | UKWN | UL | UL | UL | UL | UL |
| 5 | DL | DL | DL | DL | UKWN | UKWN | UL | DL | DL | DL | DL | UKWN | UKWN | UL |
| 6 | DL | DL | UKWN | UKWN | UL | UL | UL | DL | DL | UKWN | UKWN | UL | UL | UL |
| 7 | DL | UKWN | UKWN | UL | UL | UL | UL | DL | UKWN | UKWN | UL | UL | UL | UL | wherein a symbol identified as "UKWN" is capable of being overridden by a DL symbol or an UL symbol by a dynamic signaling.

34. The base station of claim 31, wherein the first configuration comprises at least one first switching point in the first half of the slot, and wherein the second configuration comprises at least one second switching point in the second half of the slot.

35. The base station of claim 34, wherein the at least one first switching point and the at least one second switching point are based on 14-symbol and 7-symbol switching.

36. The base station of the claim 34, wherein each of the at least one first switching point and the at least one second switching point of the second configuration indicates switching from a downlink transmission direction to an uplink transmission direction;
or each of the at least one first switching point and the at least one second switching point indicates switching from the uplink transmission direction to the downlink transmission direction.

37. The base station of claim 36, wherein the at least one first switching point and the at least one second switching point indicates location of at least one guard symbol or location of one or more unknown symbols.

38. The base station of claim 31, wherein two symbols of another numerology occupy the same time period as one symbol of a reference numerology.

39. The base station of claim 31, wherein the SFI is indicated based on a reference numerology, the reference numerology having a scalable relationship with another numerology.

40. A network system comprising:
a component in a backhaul network; and
a base station communicating data with the component, the base station configured to:
  transmit a slot format information (SFI) to a user equipment,
  wherein the SFI indicates at least one slot formation configuration, each of the at least one slot formation configuration comprises a first configuration associated with symbols within a first half of a slot and a second configuration associated with symbols within a second half of the slot, the first configuration indicates location of first at least one uplink symbol and location of first at least one downlink symbol, and the second configuration indicates location of second at least one uplink symbol and location of second at least one downlink symbol, and
  wherein the first configuration and the second configuration are indicated by the SFI based on a predefined relationship without the base station transmitting the predefined relationship to the user equipment, and wherein the predefined relationship defines the first configuration and the second configuration having the same configuration in the first half of the slot and the second half of the slot; and
communicate a downlink data transmission or an uplink data transmission based on at least one slot formation configuration.

* * * * *